US006814409B2

(12) United States Patent
Jackson

(10) Patent No.: US 6,814,409 B2
(45) Date of Patent: Nov. 9, 2004

(54) HYDRAULIC DRIVE SYSTEM

(75) Inventor: Henry Warn Jackson, Sherwood, OR (US)

(73) Assignee: A-Dec, Inc., Newberg, OR (US)

(*) Notice: Subject to any disclaimer, the term of this patent is extended or adjusted under 35 U.S.C. 154(b) by 0 days.

(21) Appl. No.: 10/121,266

(22) Filed: Apr. 11, 2002

(65) Prior Publication Data

US 2002/0149248 A1 Oct. 17, 2002

Related U.S. Application Data

(60) Provisional application No. 60/283,653, filed on Apr. 12, 2001.

(51) Int. Cl.[7] .......................... F16D 31/02; A61G 15/00

(52) U.S. Cl. ............. 297/330; 297/344.16; 297/344.17; 297/362.11; 297/362.13; 60/413; 60/484

(58) Field of Search ........................... 297/330, 344.17, 297/344.16, 362.13, 362.11; 60/413, 484

(56) References Cited

U.S. PATENT DOCUMENTS 1,534,270 A 4/1925 Koken
1,887,328 A 11/1932 Russell
2,148,561 A 2/1939 Kempton et al.
2,928,243 A 3/1960 Albright
3,188,043 A 6/1965 Dlouhy et al.
3,188,136 A 6/1965 Redfield et al.
3,240,529 A 3/1966 Boulsover
3,311,407 A 3/1967 Horie
3,368,845 A 2/1968 Watanabe
3,470,692 A 10/1969 Kamp
3,474,623 A 10/1969 Barrett et al.
3,514,153 A 5/1970 Maurer et al.
3,593,521 A 7/1971 Gardella et al.
3,698,673 A * 10/1972 Olsen ..................... 297/330 X
3,853,350 A 12/1974 Leffler
3,857,461 A 12/1974 Schmitt
3,952,511 A * 4/1976 Turner et al. ................. 60/430
4,043,127 A 8/1977 Kubik
4,098,083 A * 7/1978 Carman ....................... 60/414
4,168,099 A 9/1979 Jacobs et al. ........... 297/330 X
4,193,746 A 3/1980 Aman, Jr.
4,222,719 A 9/1980 Johnson
4,289,221 A 9/1981 Chambers et al.
4,375,902 A 3/1983 Tai et al.
4,401,417 A 8/1983 Davis
4,420,935 A 12/1983 Kobald
4,457,387 A * 7/1984 Taylor ....................... 180/6.48
4,478,041 A 10/1984 Pollman
4,480,972 A 11/1984 Zumbusch
4,551,973 A 11/1985 Broadhead
4,660,380 A 4/1987 Höfer et al.
4,681,517 A 7/1987 Schulz et al.
4,688,381 A 8/1987 Aichele et al.
4,739,795 A 4/1988 Ewbank et al.
4,759,183 A 7/1988 Kreth et al.
4,762,146 A 8/1988 Ewbank et al.

(List continued on next page.)

FOREIGN PATENT DOCUMENTS

EP 0 673 633 A2 9/1995
EP 1 186 257 A2 3/2002

*Primary Examiner*—Rodney B. White
(74) *Attorney, Agent, or Firm*—Klarquist Sparkman, LLP

(57) ABSTRACT

A hydraulic drive and fluid control system for a mechanism having at least two fluid actuated cylinder includes a bi-directional motor/gear pump. A monolithic block manifold has intersecting bores formed therein in which valving and control mechanism for the fluid circuit is mounted. The fluid control system includes a variety of elements for providing smooth action of the cylinders at start, stop, and intermediate operations. These include piston-style accumulators, self-actuating fluid flow rate control valves and cushion valves.

64 Claims, 11 Drawing Sheets

U.S. PATENT DOCUMENTS 4,765,288 A 8/1988 Linder et al.
4,765,693 A 8/1988 Stegmaier
4,850,191 A 7/1989 Kreth et al.
4,856,278 A 8/1989 Widmann et al.
4,860,634 A 8/1989 Hein
4,892,465 A 1/1990 Born et al.
5,015,035 A * 5/1991 Stoeckl et al. .......... 297/330 X
5,123,815 A 6/1992 Larkin et al.
5,170,692 A 12/1992 Lonnemo
5,190,349 A * 3/1993 Austin et al. ............... 297/316
5,214,360 A * 5/1993 Gonser et al. .............. 318/551
5,236,244 A * 8/1993 Rice ........................... 297/316
5,251,442 A 10/1993 Roche
5,253,982 A 10/1993 Niemiec et al.
5,256,038 A 10/1993 Fairman
5,267,778 A 12/1993 Krebs et al.
5,293,745 A 3/1994 Roche
5,295,737 A 3/1994 Epple et al.
5,305,718 A 4/1994 Müller
5,315,829 A 5/1994 Fischer
5,319,932 A 6/1994 Roche
5,320,047 A 6/1994 Deurloo et al.
5,329,890 A 7/1994 Mueller
5,374,167 A 12/1994 Merbold
5,427,337 A 6/1995 Biggs
5,454,702 A 10/1995 Weidhass
5,487,403 A 1/1996 Mollo
5,528,782 A * 6/1996 Pfeuffer et al. ................ 5/611
6,279,317 B1 * 8/2001 Morgan ....................... 60/413
6,397,414 B1 6/2002 Lloyd
2003/0071503 A1 * 4/2003 Brockway et al. .......... 297/330

* cited by examiner

HYDRAULIC DRIVE SYSTEM

PRIORITY CLAIM

This application claims the benefit of U.S. Provisional Patent Application No. 60/283,653, filed Apr. 12, 2001.

FIELD OF THE INVENTION

This invention relates generally to a hydraulic drive system and elements thereof which may be used for actuating devices having multiple operations, such as a chair having both lift and tilt features.

BACKGROUND

Hydraulic drive systems are used in many operations for powering multiple actions. Examples of such are power actuated chairs, such as dental chairs, which often are operated by pressurized hydraulic fluid systems in which one hydraulic cylinder, or ram, is operable to raise the chair, and a second hydraulic cylinder, or ram, is operable to tilt the chair or a portion thereof. Many prior hydraulic drive systems have been disclosed in the past, but each has had disadvantages.

Some prior systems use drive pumps, motor units, and control circuits which produce movement of the item to be driven in a manner which is not as smooth as may be desired. In a hydraulically actuated chair, for example, prior systems may produce movement which is too fast, too slow, or may produce jerking start and stop actuation which is uncomfortable for the user.

Prior systems also have been constructed in such a manner that they are more complex and expensive than may be desired to fulfill their functions. Often prior systems have been produced in such a manner that they require an undesirable number of actuating valves and are produced in a generally open architecture of hoses and connections which are subject to breakage and leakage.

SUMMARY OF THE DISCLOSURE

An object of the present disclosure is to provide a novel, efficient, and economically produced hydraulic drive system.

Another object is to provide a hydraulic drive system which produces smooth operation of driven components actuated by the system.

More specifically, an object is to provide a hydraulic drive system such as is used to drive raising and tilting cylinders for a chair, such as a dental chair, in such a manner as to provide comfortable starting, stopping, and intermediate operation for a party carried in the chair.

Another object is to provide a system in which a bi-directional crescent gear pump drive is used to provide a substantially pulseless supply of pressurized fluid, with actuation of the pump in one direction providing pressurized fluid to one ram in the system, and actuation of the pump in the opposite direction providing pressurized fluid to the other ram in the system. Recognizing that more power is required for a chair lift ram than for a chair tilting ram, an electric drive motor for the pump may be used which is capable of producing greater torque in one direction than in the reverse direction, such that it may drive the pump in the direction of greater torque output to produce lifting of the chair, and may drive the pump in the reverse, lower powered, direction of the motor for producing tilting.

A still further object of the present disclosure is to provide a novel hydraulic drive system in which a minimum number of hydraulic circuit control components are required.

Yet another object is to provide a novel hydraulic drive system in which a monolithic body has a plurality of bores formed therein which extend inwardly from external surface regions of the body but do not extend fully through the body, with selected ones of the plurality of bores intersecting to produce desired fluid flow channels in a fluid supply and a fluid return circuit in the system. A system with such a monolithic body may be produced with a minimum number of machining operations for economy in manufacture and minimizes fluid leakage.

A further object of the disclosure is to provide valve assemblies for controlling fluid flow in the system, which valve assemblies are operatively mounted in selected one of said bores in the monolithic body.

Yet another object is to provide a novel cushion valve in a fluid control system which produces cushioned starting of fluid flow to moderate acceleration during actuation.

Another object is to provide a novel self-actuating fluid flow rate control valve in a pressurized fluid system operable to advantageously control the rate of fluid flow in the system throughout a wide range of operating conditions.

These and other objects and advantages will become more fully apparent as the following description is read in conjunction with the drawings which are described below.

DETAILED DESCRIPTION OF EMBODIMENTS

Figure 1:
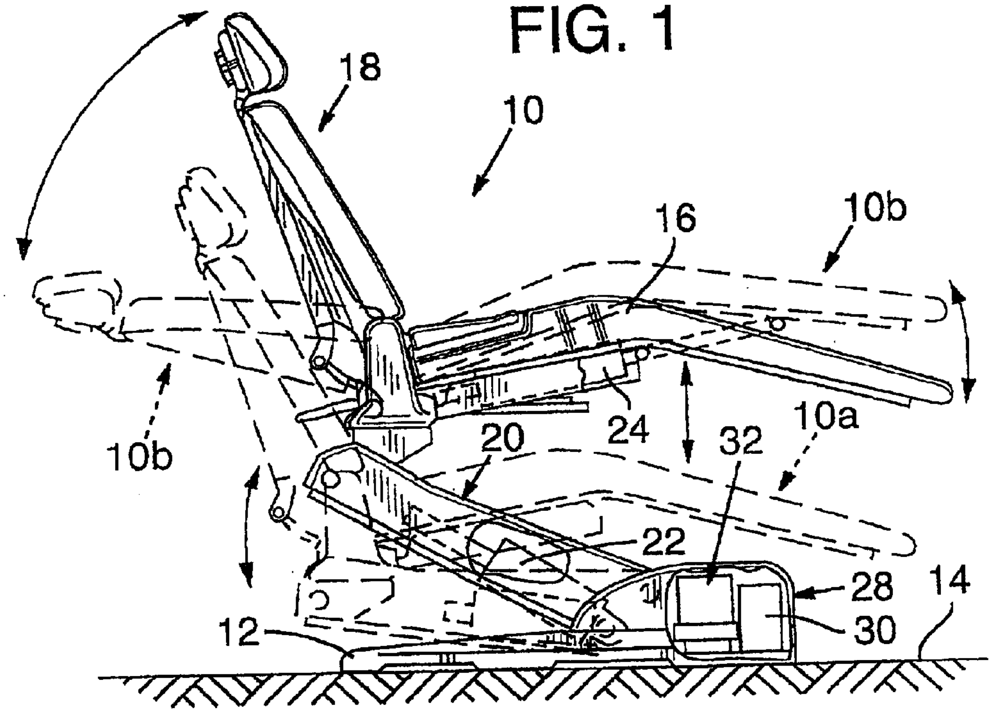
FIG. 1 is a side elevation view of a hydraulically actuated chair having lift and tilt mechanism operable by a hydraulic drive system according to an embodiment of the present invention.

Referring first to FIG. 1, one manner of use of a hydraulic drive system according to the invention is illustrated for use with a dental chair 10. The chair has a base 12 adapted to rest on a floor 14 with an upper structure including a seat portion 16 and a back, or back rest, 18. The seat is mounted on a lift mechanism 20 which includes an extensible contractible ram, or cylinder, 22. Extension of the ram acts to raise the chair to the elevated position illustrated in solid outline in FIG. 1. Contraction of the ram lowers the chair to the position illustrated in dashed outline at 10*a* in FIG. 1.

The chair back 18 is pivotally connected to the rear end of seat 16 and tilting mechanism including a tilt ram, or cylinder, 24 is operable to tilt the seat and back between a generally upright position illustrated in solid outline in FIG. 1 and a rearwardly tilted position illustrated at 10*b* in dashed outline.

A hydraulic drive system for the lift and tilt cylinders is illustrated generally at 28 in a broken away portion of base 12. The drive system 28 includes a fluid supply tank, or reservoir, 30 for supplying hydraulic operating fluid to the primary drive unit which includes a motor and pump combination 32. The fluid in the supply tank is retained at a level above the top of a base manifold 36, described below.

Figure 3:
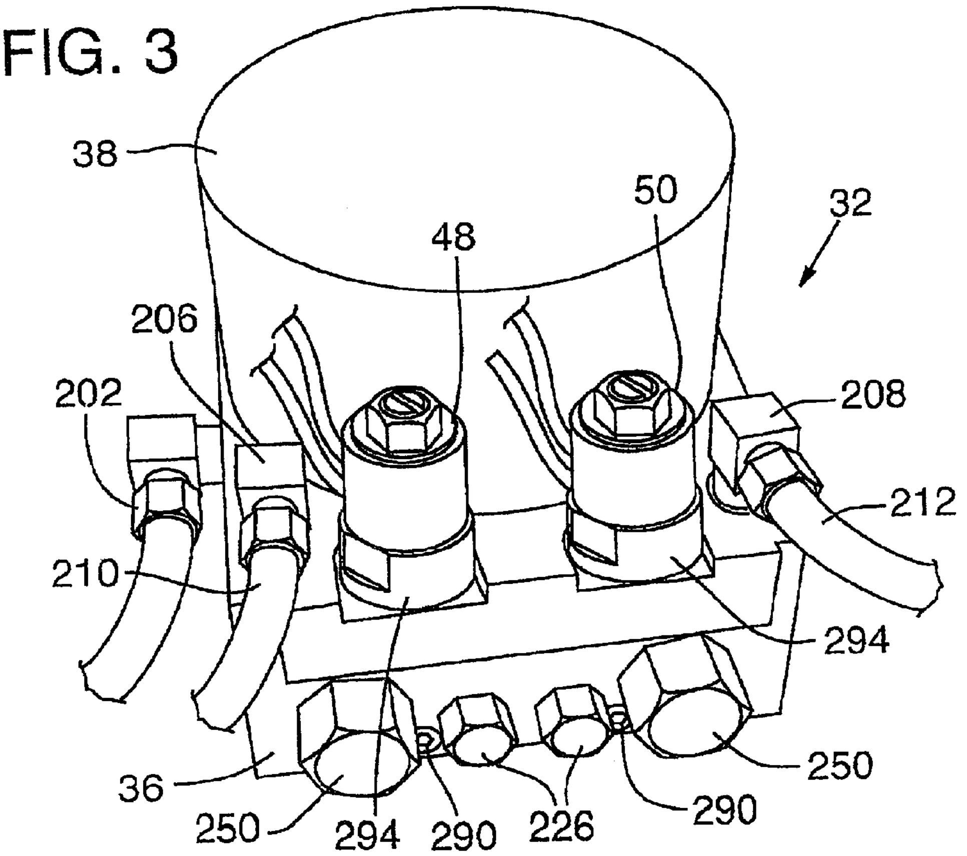
FIG. 3 is a top perspective view of a major portion of a hydraulic drive system according to the present invention.
Figure 4:
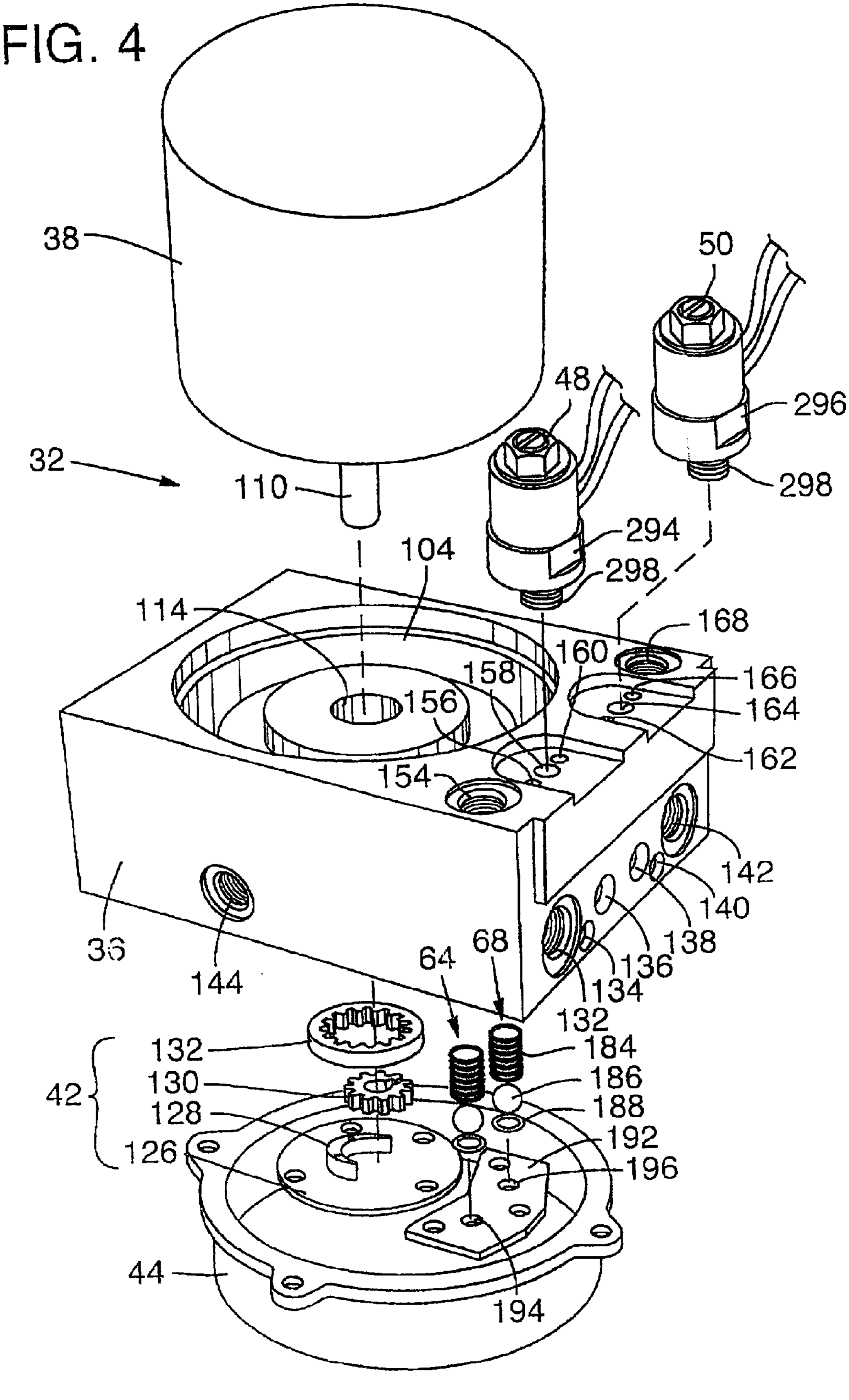
FIG. 4 is an exploded perspective view of several of the component parts of the system illustrated in FIG. 3.
Figure 6:
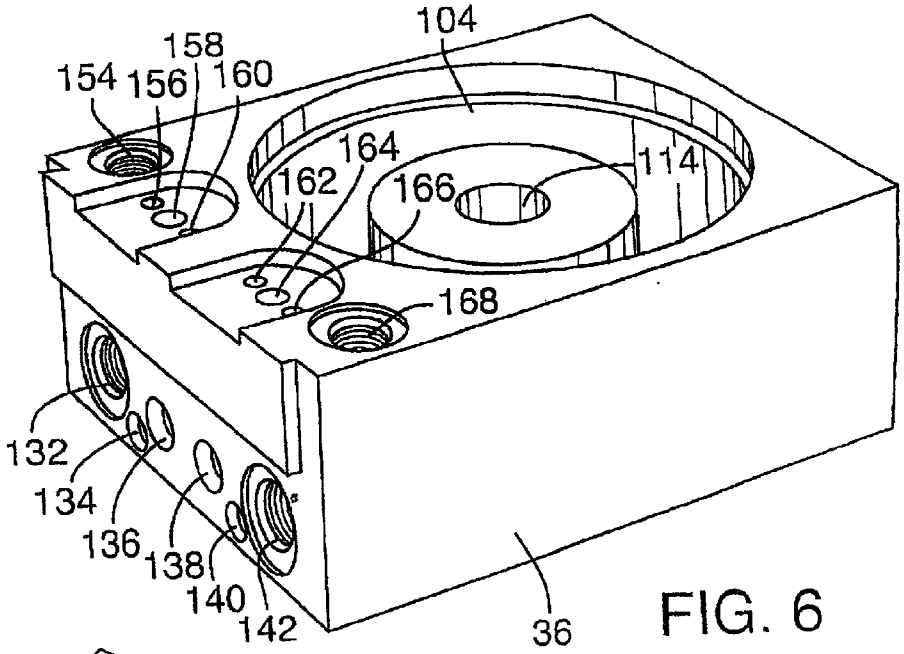
FIG. 6 is a top perspective view of the manifold block alone.

Referring to FIGS. 3 and 4, the motor/pump combination 32 generally includes a base manifold 36 (also referred to herein as "base" or "manifold") atop which is mounted a reversible, or bi-directional, electric motor 38. The motor used in the embodiment described is an AC motor, but others may be used also. A crescent gear pump assembly 42 is connected to the bottom of base 36 with the shaft 110 of electric motor 38 extending downwardly through the base to drive pump 42. The component parts of the gear pump and their assembly will be described in greater detail below. A fluid holding sump, or reservoir, 44 underlies the base and may be filled with hydraulic fluid from reservoir 30 to be pumped therefrom by pump 42 and distributed to operating cylinders, or rams, such as lift ram 22 and tilt ram 24 such as would be used for actuating the powered lift and/or tilt mechanism of a chair.

In operation more power may be required to raise the chair than may be needed to tilt the back. The motor, being bi-directional may be capable of supplying greater power, or torque, when operated in one direction than in the opposite direction. Thus the motor/pump combination preferably will be connected in the system, such that it will operate in its mode of greatest power, or torque to supply chair lifting energy.

Figure 2:
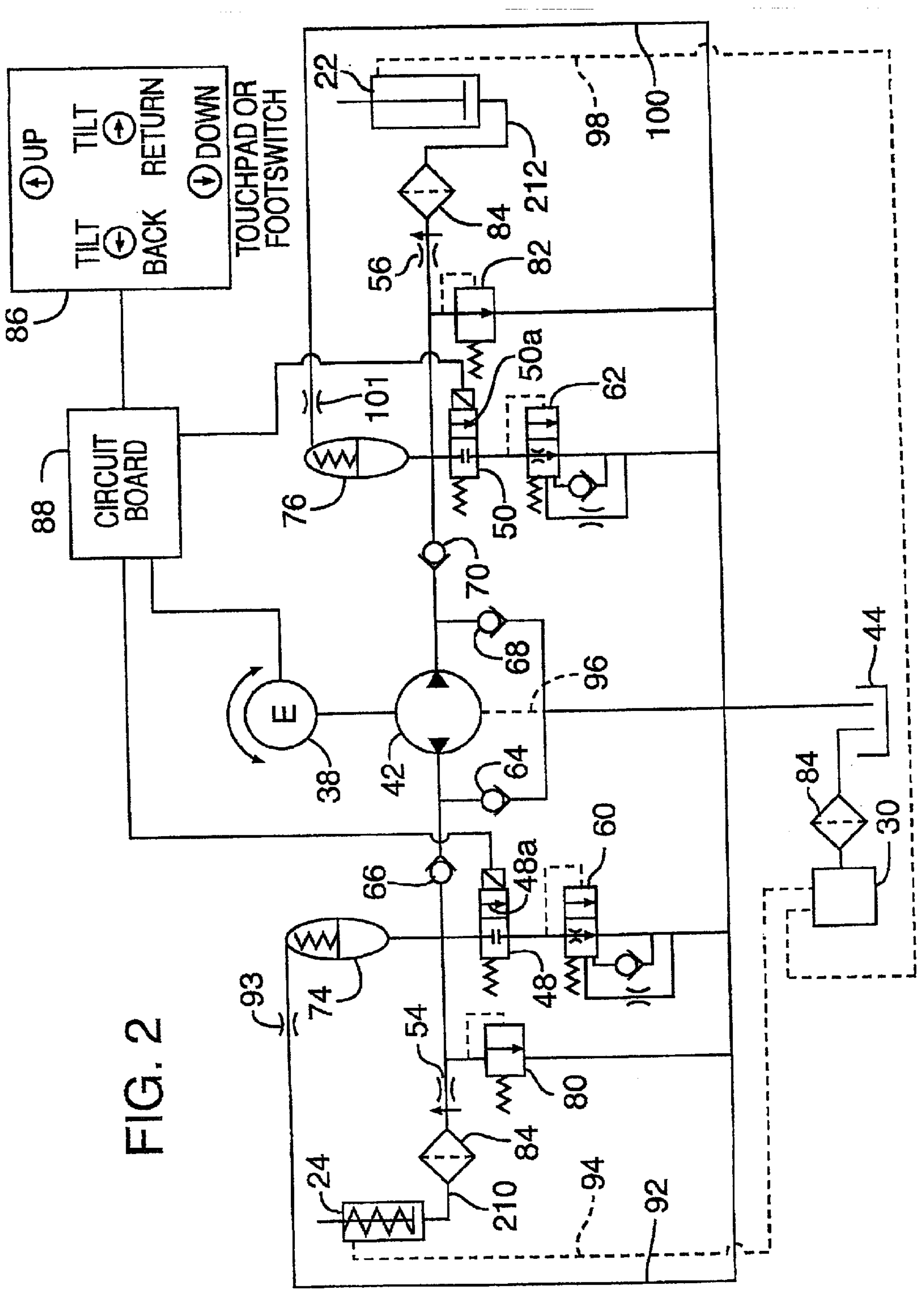
FIG. 2 is a schematic diagram of a hydraulic drive system incorporating features according to the present invention.

A simplified hydraulic schematic diagram for the system is shown in FIG. 2. Lift, or first, cylinder, or ram, 22 is shown which may be used to lift a chair upon pressurized fluid being introduced to the lower end of the ram. A tilt, or second, cylinder, or ram, 24 is provided for tilting the chair fore and aft. Introducing pressurized fluid to the lower end of the tilt cylinder causes it to tilt the chair in one direction and a spring and gravity may be utilized upon release of such fluid to return the cylinder to a retracted condition. The system, in addition to cylinders 22, 24 includes the previously described bi-directional electric motor 38, pump 42, and fluid holding sump 44. The system also includes a pair of solenoid actuated valves 48, 50, flow rate control valves 54, 56, cushion valve assemblies 60, 62, and one-way check valves 64, 66, 68, 70. The system also includes a pair of hydraulic accumulators 74, 76 and pressure relief valves indicated generally at 80, 82.

An operator's touch pad, or foot switch, 86 is provided which is operatively coupled to a circuit board 88 for controlling actuation of motor 38 and solenoids 48, 50 to produce desired actuation of the lift and tilt cylinders as will be described in greater detail below.

A plurality of filters 84 are disposed in the circuit to remove contaminants and maintain cleanliness of hydraulic fluid in the system.

Explaining briefly operation of the device generally as described in relation to the schematic of FIG. 2, should it be desired to extend ram 22 to lift the chair, motor 38 is operated in one direction to operate pump 42, such that hydraulic fluid is drawn from sump 44 through check valve 64, is pumped through pump 42 to increase its pressure, and is pumped out through check valve 70, accumulator 76, and flow-rate control valve 56, to the lower side, or end, of ram 22, thus extending the ram. Check valves 66, 68 remain closed. These components and appropriate connectors form a fluid supply circuit for the lift cylinder.

Should it be desired to change the tilt of the chair by extending ram 24, motor 38 is operated in the opposite direction causing pump 42 to turn in the opposite direction to draw fluid from sump 44 through check valve 68 through pump 42, and distribute it under pressure through check valve 66, accumulator 74, and flow rate control valve 54 to the tilt cylinder 24. Check valves 64, 70 remain closed. Throughout actuation of both cylinders 22, 24, solenoid valves 48, 50 are in the positions illustrated with flow prohibited through these valves, thus preventing return of fluid to the reservoir from either of the cylinders 22, 24. These components and appropriate connectors form a fluid supply circuit for the tilt cylinder.

To retract cylinder 22, solenoid 50 is actuated, such that flow is allowed therethrough in the direction of arrow 50*a*. The weight of the chair (and also of a person therein if occupied) causes fluid to flow from the ram through fluid flow rate control valve 56, accumulator 76, solenoid valve 50, and through cushion valve assembly 62 to return fluid to sump 44. These components and appropriate connectors form a fluid return circuit for the lift cylinder.

Similarly, should it be desired to retract tilt cylinder 24, solenoid valve 48 is actuated so that fluid may flow therethrough in the direction of arrow 48*a*, through a flow rate control valve 54, accumulator 74, solenoid valve 48, and through cushion valve assembly 60 to return to sump 44. These components and appropriate connectors form a fluid return circuit for the tilt cylinder. A spring, or gravity, and the weight of a person, if occupied, operating on the tilt cylinder causes fluid to flow therefrom when solenoid valve 48 is opened.

Dashed lines 94, 98 illustrate fluid return lines through which fluid which may leak past seals in the operating components to which they are connected may return freely to the sump and for the transport of air from the rod end of the rams on extension of the rams. Line 96 vents the electric motor shaft seal from overpressurization. Lines 92, 100 connect the lower-pressure sides of accumulators 74, 76 to sump 44, as will be described in greater detail below. Control orifices 93, 101 are indicated in lines 92, 100, respectively, through which fluid from the lower pressure side of accumulators 74, 76 may return to sump 44. These orifices may supply additional cushioning in the hydraulic system as will become more fully apparent as the system is described in greater detail below. Referring to FIGS. 3–12, manifold 36 is shown as a monolithic, or unitary, block having a plurality of bores and other openings machined therein. The base, or manifold, block 36 has a motor receiving cavity 104 formed in its upper side into which motor 38 fits as illustrated generally in FIG. 11.

Figure 11:
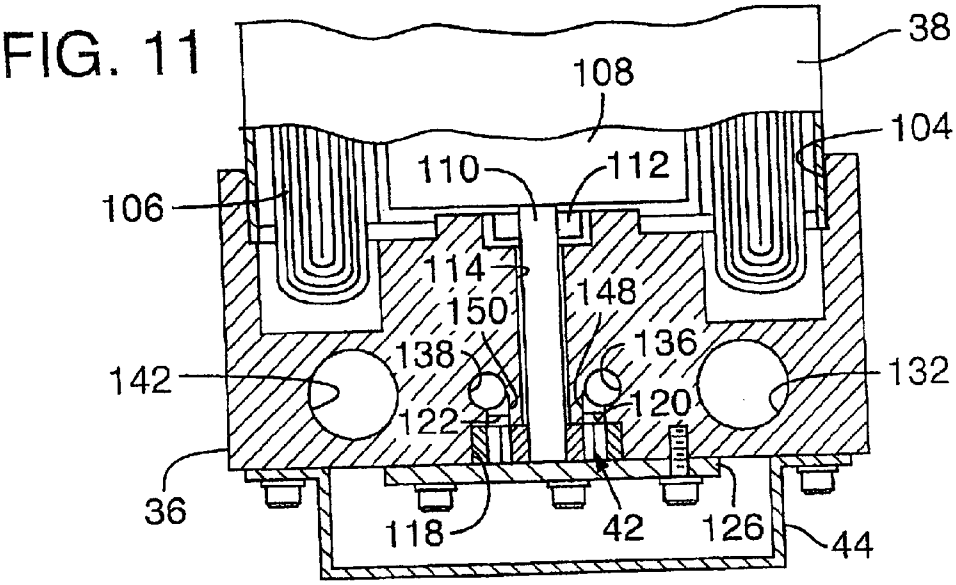
FIG. 11 is a cross sectional view taken along the line 11—11 in FIG. 7, with a motor, gear pump, and fluid sump attached.

Referring to FIG. 11, the motor includes a stator 106, and a rotor 108 which has an elongate rotor, or drive, shaft 110 depending therefrom. A shaft seal 112 is provided to fit about shaft 110 on installation.

Figure 9:
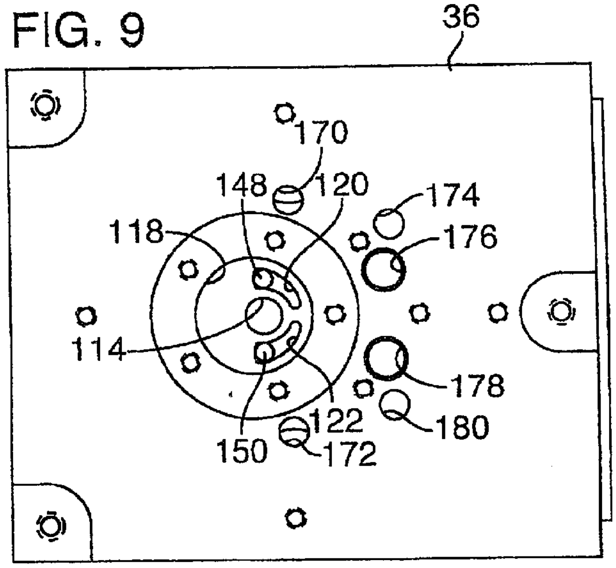
FIG. 9 is a bottom plan view of the manifold block.
Figure 10:
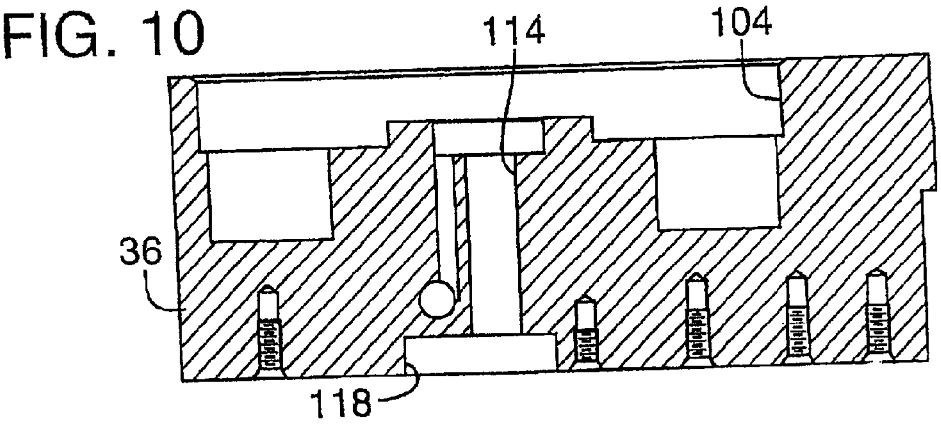
FIG. 10 is a cross sectional view taken along the line 10—10 in FIG. 7.

The manifold body has a bore 114 extending vertically therethrough through which shaft 110 extends. The lower end of shaft 110 opens into a shallow cylindrical bore, or cavity, 118 formed in the bottom of the manifold block 36 adapted to receive components of the pump assembly. As is best seen in FIG. 9, shallow bore 118 and motor shaft bore 114 which opens thereinto are non-concentric, with their center axes being offset. This is to accommodate the gear pump assembly 42 as will be described in greater detail below.

As best seen in FIG. 9, a pair of kidney-shaped openings 120, 122 are formed, or machined, in the top of cavity 118 and extend a short distance upwardly into the manifold block 36 from cavity 118. The kidney-shaped openings are referred to as back tilt gear feed kidney and base lift gear feed kidneys, respectively, and are symmetrically disposed on opposite sides of motor shaft bore 114.

Figure 5:
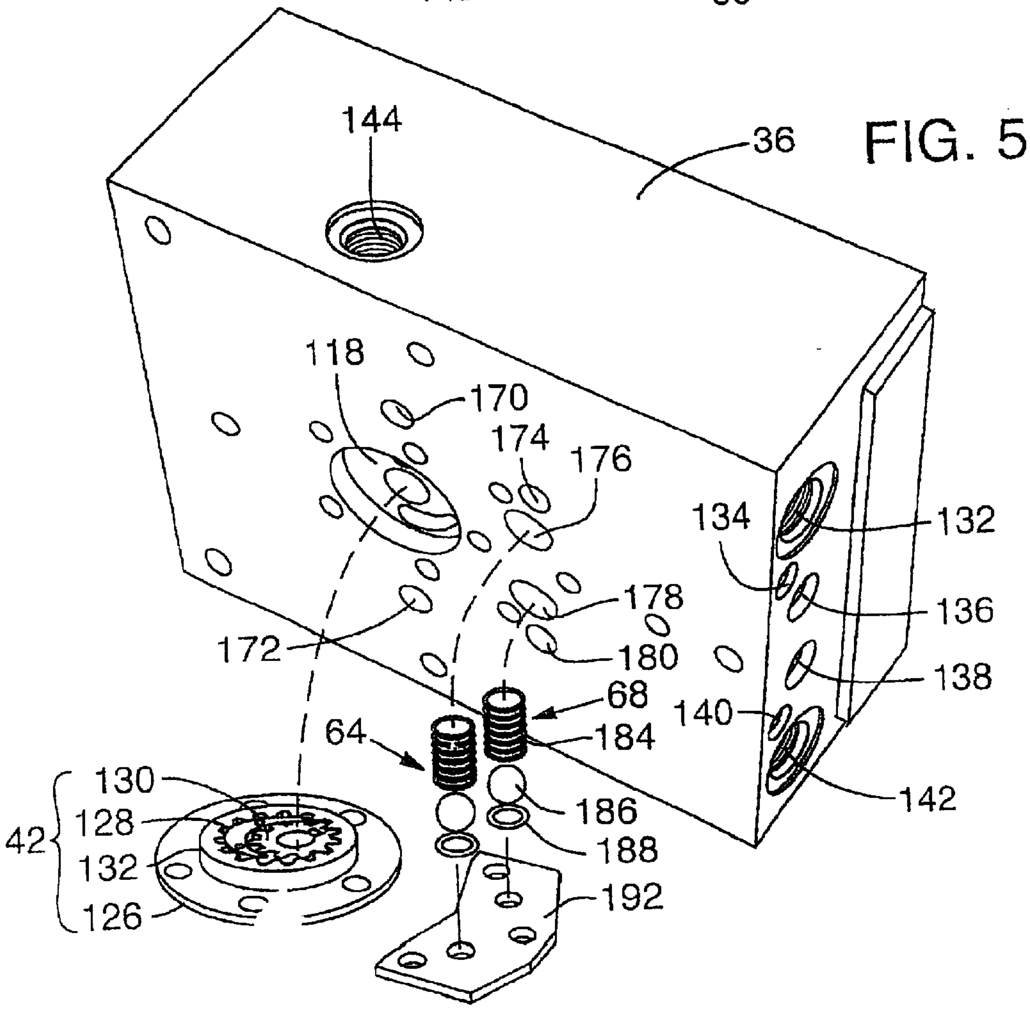
FIG. 5 is a bottom perspective view of a manifold block in the system with gear pump and check valve assembly components ready for installation.
Figure 7:
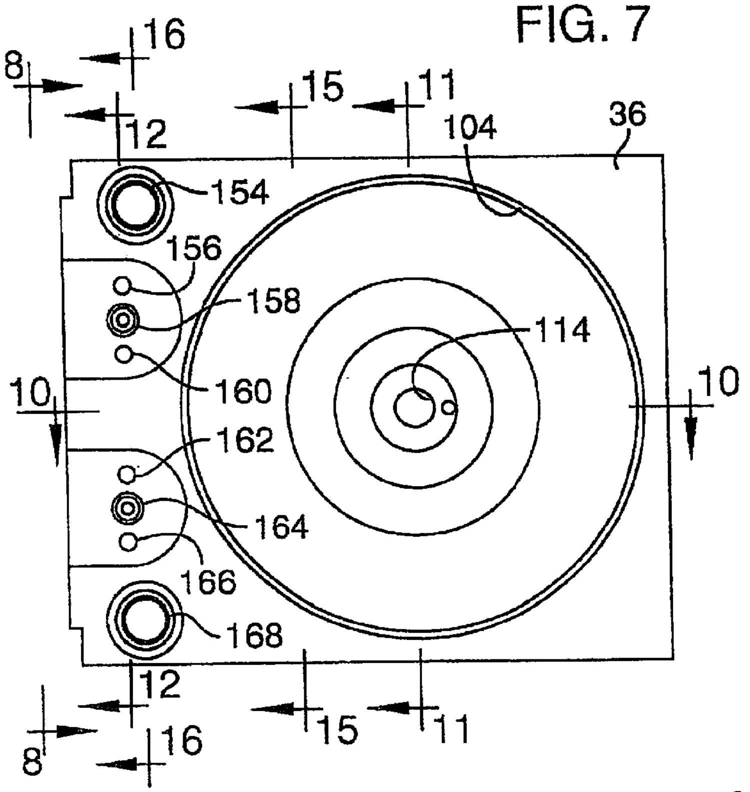
FIG. 7 is a top plan view of the manifold block.
Figure 8:
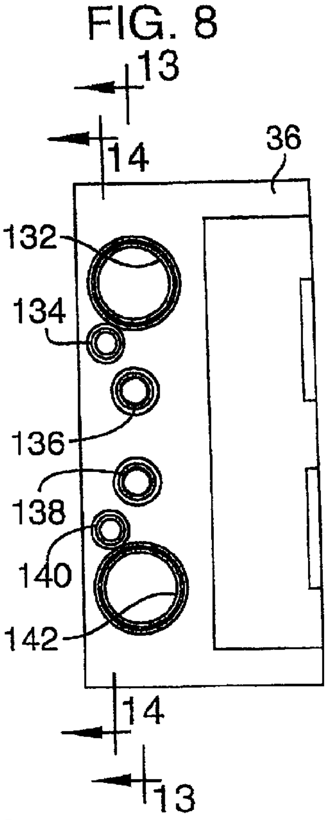
FIG. 8 is an end view of the manifold block taken along line 8—8 in FIG. 7.

Referring to FIGS. 4 and 5, pump assembly 42 includes four primary components. These include a base plate 126 to which an upstanding separator crescent 128 is secured. The crescent is substantially semi-circular in configuration having a concave inner side and a convex outer side. A pinion drive gear 130 rests on base plate 126 and within the concave inner side of crescent 128. A driven ring gear 132 is positioned to extend about the convex outer side of crescent 128 and about pinion drive gear 130 and has inwardly facing gear teeth which mesh with outwardly directed teeth of drive gear 130. When assembled the base plate is bolted to the underside of manifold block 36 as best illustrated in FIG. 11, to produce a substantially tight fit therebetween, with crescent 128, drive gear 130, and ring gear 132 resting within cavity 118. Drive gear 130 is keyed to the lower end of drive shaft 110 to be driven thereby.

The assembled gear pump is positioned in cavity 118 underlying kidney-shaped openings 120, 122. In operation the inner drive gear 130 keyed to the motor drive shaft 110 is rotated in either of opposite directions by actuation of the bi-directional motor. The teeth of the inner drive gear 130 mesh with the inwardly directed teeth of driven gear 132 and carry the driven gear with it upon rotation. Hydraulic fluid is moved through the pump by the opening of cavities between the gear teeth at what might be considered an inlet side and meshing of the teeth on moving toward the discharge side. The stationary crescent separates the suction and discharge portions of the pump. Such a pump provides smooth and almost pulseless flow of fluid being pumped. With the pump assembly received in cavity 118 and attached to motor shaft 110, operation of the motor and pump in one direction during operation will direct fluid under pressure into one of the kidney-shaped openings 120, 122 and operation in the opposite direction will direct fluid under pressure into the other kidney-shaped opening.

Describing manifold block 36 in greater detail, it has a plurality of substantially horizontally and longitudinally disposed bores 132, 134, 136, 138, 140, 142 extending inwardly from one end of block 36. A side bore 144 extends laterally inwardly from a side of base 36 as best illustrated in FIGS. 4 and 5. It should be recognized that all of these horizontally extending bores 132–144 extend inwardly from their associated surfaces of the manifold block, but do not extend full therethrough to an opening at the opposite side of the block.

As possibly best seen in FIGS. 9 and 11, vertically extending bores 148, 150 extend upwardly from kidney-shaped openings 120, 122, respectively, and intersect bores 136, 138, respectively.

A plurality of substantially parallel, vertically extending bores open to the top side of manifold body 36, numbered 154, 156, 158, 160, 162, 164, 166, 168. Again, it should be recognized that these vertically extending bores extend inwardly from their associated surface of manifold block 36, but do not extend full through the block to the opposite side thereof.

Referring more specifically to FIGS. 5 and 9, a plurality of vertically extending bores 170, 172, 174, 176, 178, 180 are formed in the lower, or under, side of block 36. Again, these bores extend inwardly from their associated surface of manifold block 36 but do not extend fully through the manifold block to the opposite side thereof.

A plurality of vertically extending bores are provided in the bottom and top of the manifold block for receiving bolts or screws for holding the motor in place on the manifold block, and for bolting, or screwing, other assembly parts to the underside, or bottom, of the manifold block as will be described in greater detail below.

As will be seen several of the bores have threaded portions for connection of other elements in the assembly.

Figure 12:
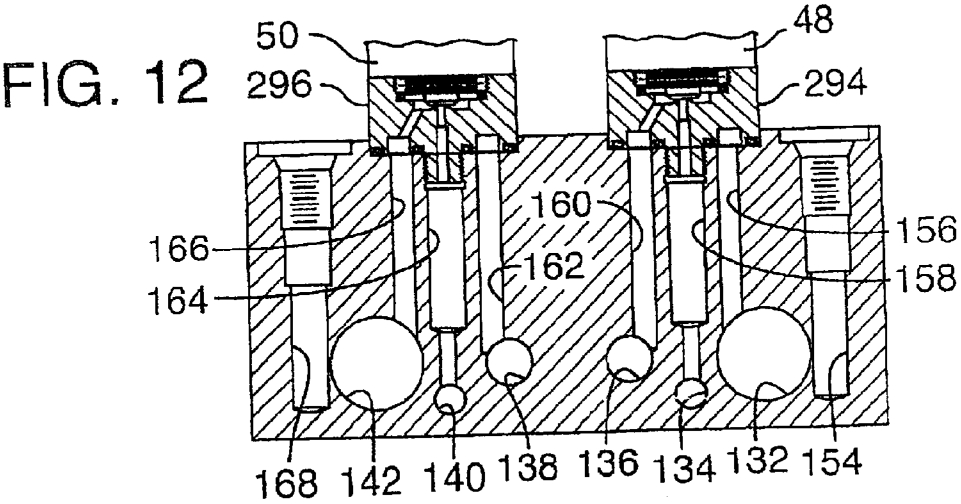
FIG. 12 is a cross sectional view taken along the line 12—12 in FIG. 7 with a pair of solenoid actuated valves secured to the manifold block.
Figure 13:
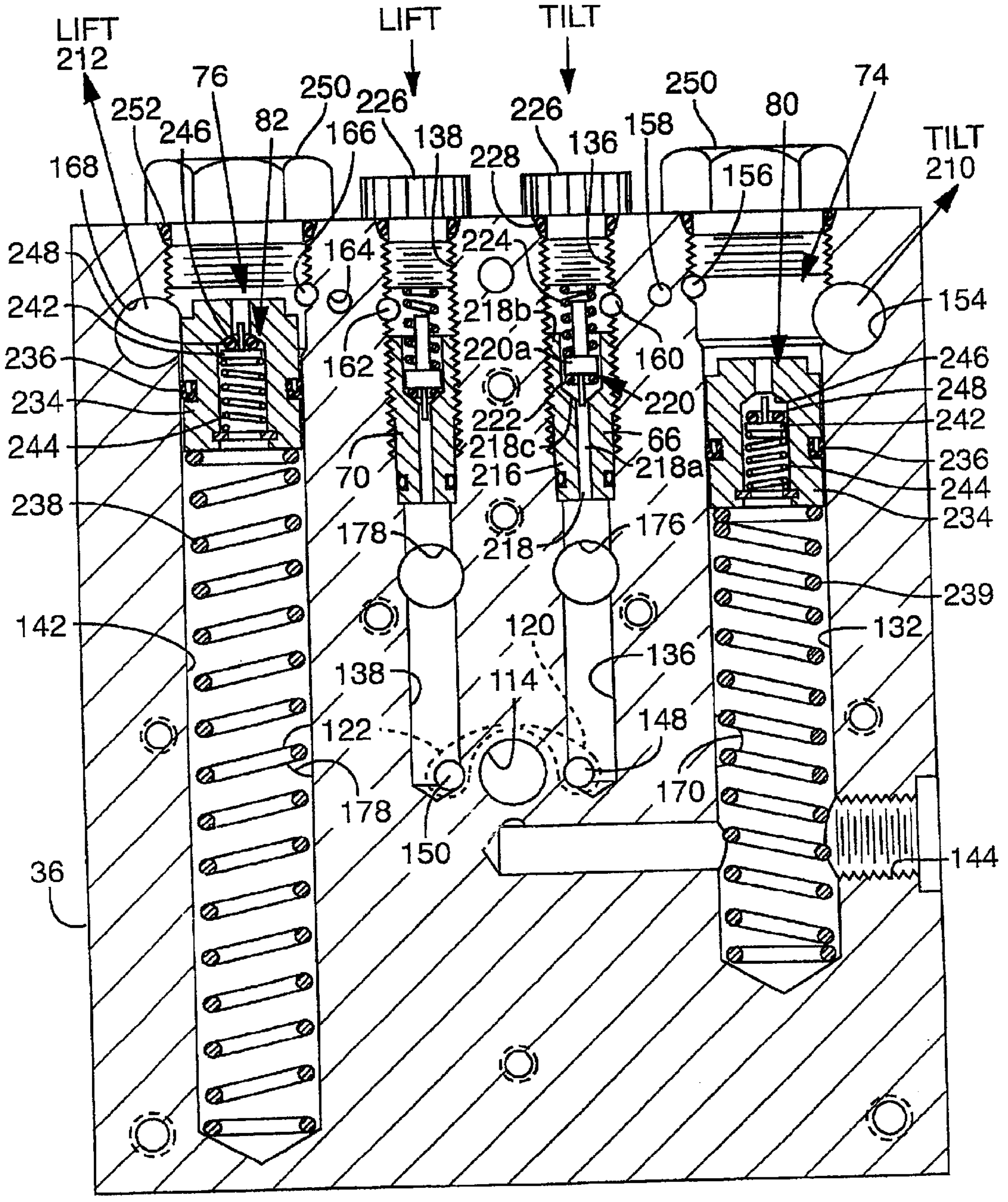
FIG. 13 is an enlarged cross sectional view taken generally along the line 13—13 in FIG. 8 with various valve assemblies in bores in the manifold.

Fluid flow circuits within the manifold block are provided by intersections between selected ones of the horizontally disposed and vertically disposed bores. As best seen in FIG. 11, kidney-shaped opening 120 intersects vertical bore 148 which intersects horizontal bore 136. Similarly, kidney-shaped opening 122 intersects vertical bore 150 which intersects horizontal bore 138. Referring to FIGS. 12 and 13, bore 136 intersects vertical bore 160 and bore 138 intersects vertical bore 162.

Figures 14, 14A, 14B:
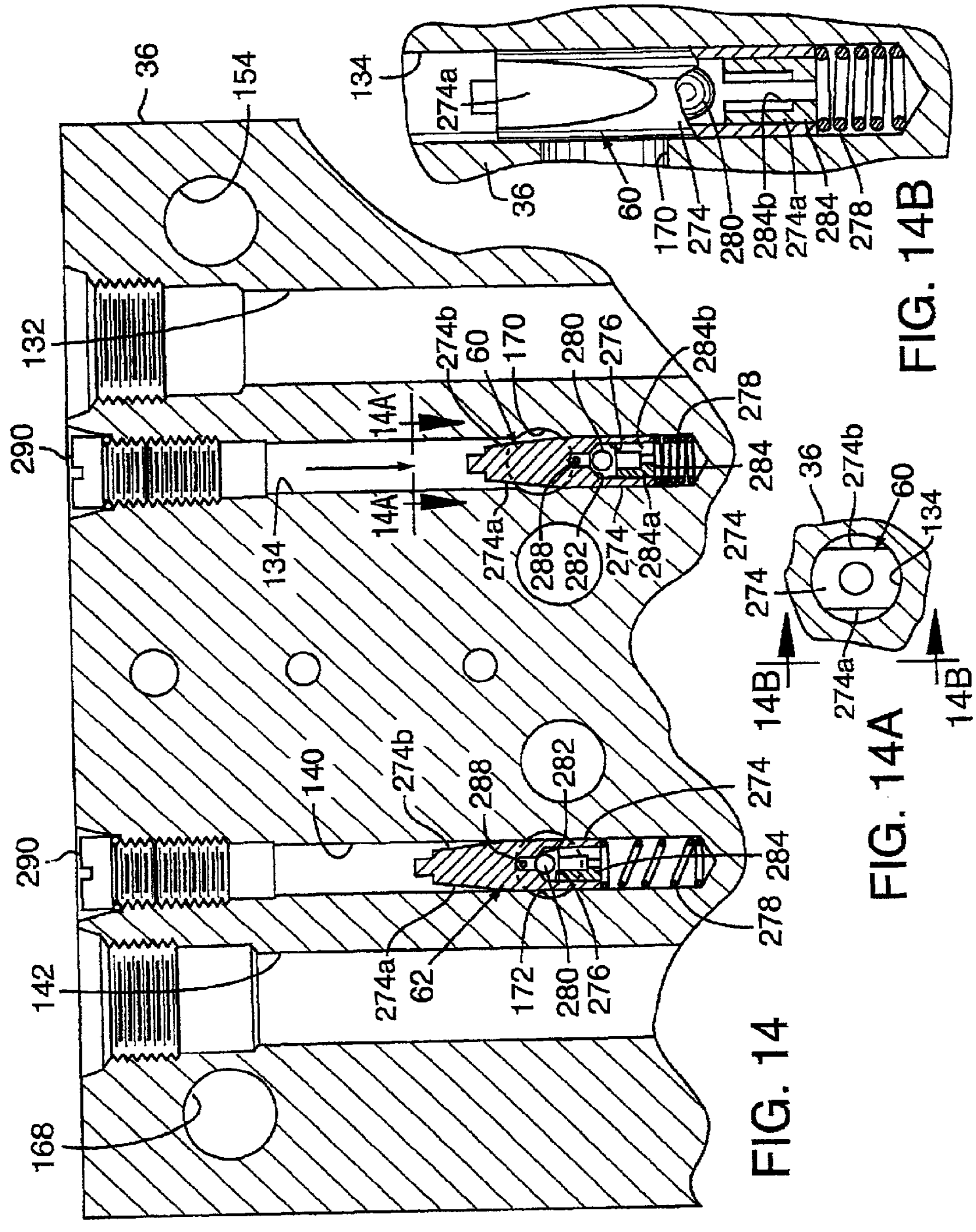
FIG. 14 is an enlarged cross sectional view taken generally along the line 14—14 in FIG. 8 with cushion valve assemblies received in bores in the manifold.
FIG. 14A is an enlarged view taken along the line 14A—14A in FIG. 14.
FIG. 14B is a view taken along the line 14B—14B in FIG. 14A.

Referring to FIGS. 12 and 14, vertical bore 158 intersects horizontal bore 134 adjacent one end of block 36, and at a more central portion of the block bore 134 intersects vertical bore 170 which opens to the bottom of the block. Similarly, adjacent one end of the block vertical bore 164 intersects horizontal bore 140 which, at a more central portion of the block, intersects vertical bore 172 which opens to the bottom of the block.

Referring to FIGS. 12 and 13, horizontally disposed bore 132 intersects vertical bores 154, 156 adjacent one end of the block, and at a more central region of the block bore 132 intersects horizontal infeed bore 144 and vertical bore 170 which opens to the bottom of the block. Similarly, horizontally disposed bore 142 adjacent one end of the block intersects vertical bores 166, 168 and at a region more central of the block intersects vertical bore 178 which opens to the bottom of the block.

Figure 15:
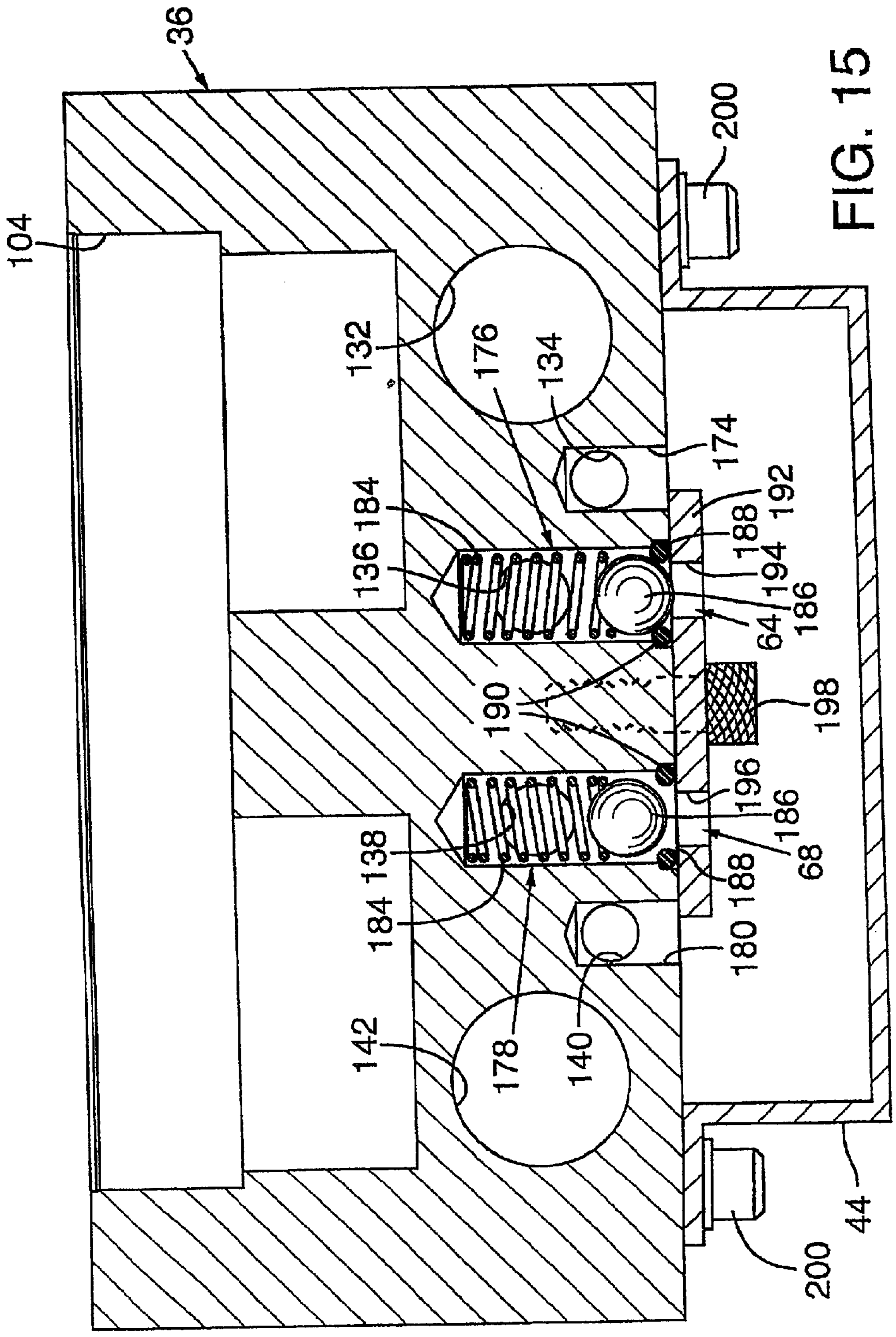
FIG. 15 is an enlarged cross sectional view taken generally along the line 15—15 in FIG. 7 with check valve assemblies in bores in the manifold and a fluid sump secured thereto.

Referring to FIGS. 4, 5, and 15, the component assembly parts for ball check valves 64, 68 are illustrated in greater detail. Each ball check valve includes a spring 184, a ball 186, and an elastomeric O-ring seal 188. One assembly including spring, ball, and O-ring is inserted into one of bores 176, 178 and the other spring, ball and O-ring assembly is inserted in the other of such bores. As is best seen in FIG. 15 an additional relief 190 is machined in the mouth of each of the bores to receive its associated O-ring. When the ball check valve assemblies have been inserted into their respective bores a cover plate 192 having a pair of fluid flow bores 194, 196 extending therethrough is bolted to the underside of manifold block 36 using a plurality of screws, such as that indicated at 198 which extend through accommodating bores in plate 192 and are received in threaded bores on the underside of manifold block 36. The installed check valve assemblies are shown in FIG. 15.

After gear pump assembly 42 and check valve assemblies 64, 68 have been installed at the bottom side of manifold block 36, the circular, shallow pan, or sump, 44 is attached to the underside of the manifold block using a plurality of screws as indicated generally at 200 in FIG. 15. The sump pan has a large enough diameter that it encompasses bores 170, 172, 174, 176, 178, 180 and cavity 118. All of these bores opening to the bottom side of the manifold block therefore communicate with the sump.

Previously noted fluid supply reservoir, or tank, 30 is operatively connected to the assembly via a hose connection 202 (see FIG. 3) which allows hydraulic fluid to flow through bore 144 in one side of the manifold block into bore 132 and then to exit into sump pan 44 through bore 170 in the bottom of the block (see FIG. 13). Hydraulic fluid thus will flow freely into the sump pan 44 to be available for use in the system. During use hydraulic fluid in fluid supply tank 30 is maintained at a level above the top of base manifold 36. Fluid thus may be provided to and remain in at least portions of those bores and assemblies directly connected to sump 44. These include, for example, portions of bores 132, 142, 134, 140, 136, 138 and pump assembly 42. Fluid thus will generally fill motor shaft bore 114 to the level of shaft seal 112 to assure motor shaft lubrication.

Referring to FIG. 3, a pair of hydraulic fittings 206, 208 are screwed into the threaded outer end portions of bores 154, 168, respectively. These fittings provide connections for hydraulic tubes, or hoses, 210, 212 which connect to the tilt cylinder and lift cylinder 24, 22, respectively.

Referring to FIG. 13, mounted within bore 136 is a tilt cylinder check valve 66, and a lift cylinder check valve 70 is mounted in bore 138. Both of check valves 66, 70 are similar in structure, and thus only one will be described in detail.

Each check valve (66, 70) includes a cylindrical check valve seat member 216 which has a threaded exterior allowing it to be screwed into its associated bore which is internally threaded. The seat member has a central bore 218 extending longitudinally therethrough. The inner end region 218*a* of bore 218 is hexagonal allowing the valve seat to be turned by a hex wrench to screw it into or remove it from its threaded connection in its associated bore. The opposite end of bore 218, indicated at 218*b*, has a larger cylindrical cross section. A conically shaped valve seat 218*c* extends between regions 218*a*, 218*b* of the bore.

A sealing assembly is mounted for shifting longitudinally in bore 218 relative to seat 218*c*. The sealing assembly includes an elongate stem 220 and an enlarged head 220*a*. An O-ring 222 is interposed between head 220*a* and seat 218*c* to produce sealing therebetween. A check valve spring 224 yieldably urges the check valve assembly to a closed position as illustrated for check valve 70 with head 220 pressed tightly against O-ring 222 which bears against valve seat 218*c*. A threaded plug 226 screwed into the threaded outer end of bore 136 with an O-ring seal 228 therebetween seals the outer end of bore 136 and provides a stop for one end of spring 224. Pressure fluid entering through end portion 218*a* of bore 218 acts against the check valve assembly to overcome the force of spring 224 and will open the valve to allow pressurized fluid to flow outwardly therethrough. Pressure fluid impressed against the enlarged head 220*a* on the spring side thereof acts to seal the check valve.

Referring still to FIG. 13, accumulators 74, 76 are illustrated in greater detail. They are substantially similar in design, and thus only one will be described in detail. Referring to accumulator 76, it includes a piston body, or plunger, 234 having a u-cup seal 236 extending thereabout. The piston body and seal are slidably mounted in bore 142 with a spring 238 yieldably biasing the piston body toward the outer end of bore 142. A spring 239 in bore 132 associated with accumulator 74 is shorter than spring 238 and may exert a different biasing force.

Mounted within piston body 234 is pressure relief valve assembly 82. A similar pressure relief valve assembly 80 is mounted in the piston body of accumulator 74 in bore 132. The pressure relief valve assembly 82 includes a check valve element 242 biased by a spring 244 toward a valve seat 246 with an O-ring 248 therebetween. The spring forces exerted by springs 238, 244 differ. Should a rapid increase in pressure beyond that which can be resisted by spring 244 be imposed upon the piston head the check valve element 242 will move away from seat 246 to allow the release of pressure fluid through piston body 234 to escape through bore 178 to the sump. These component parts are illustrated generally slidably received in bore 142 with a screw plug 250 screwed into the threaded end of bore 142 with an O-ring seal 252 therebetween to seal the end of bore 142 and hold the component elements therein.

Although not illustrated in detail in FIG. 13, bores 170, 178 could hold control orifices 93, 100, respectively, of a selected size to provide controlled return of fluid from bores 132, 142 to sump 44. Such controlled return of fluid could enhance the operation of the accumulators.

Figure 16:
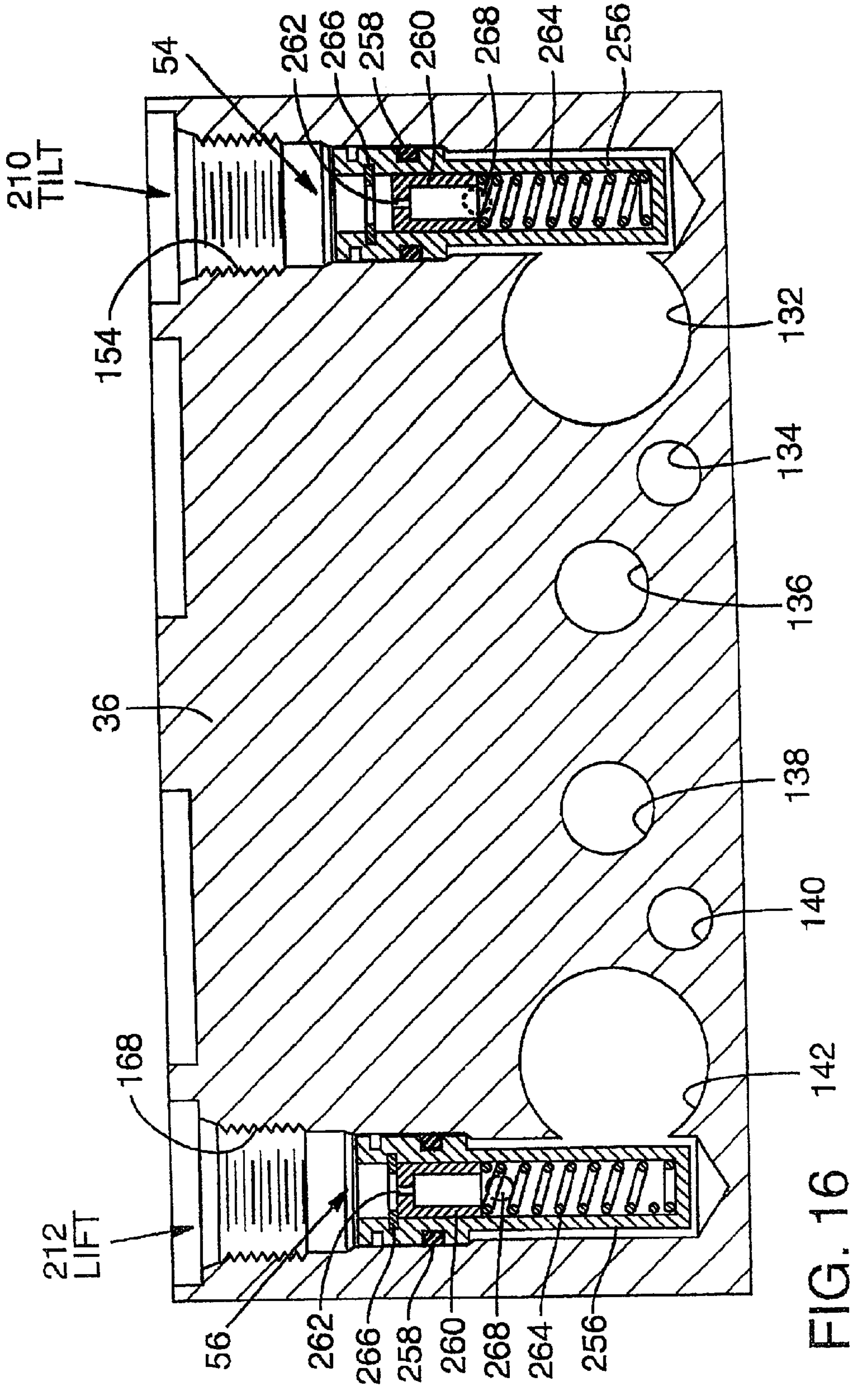
FIG. 16 is an enlarged cross sectional view taken generally along the lines 16—16 in FIG. 7 with flow rate control valve assemblies received in bores in the manifold block.

Referring to FIG. 16, self-actuating flow rate control valves 54, 56 are mounted in vertical bores 154, 168, respectively. Each of the flow rate control valve assemblies 54, 56 are similar, and thus only one will be described in detail. An elongate cylindrical cup-shaped body 256 having a closed bottom end and an open upper end is received in bore 168. An O-ring seal 258 seals the space between body 256 and bore 168. As is seen in the drawing, a major portion of the body 256 below O-ring seal 258 has a smaller diameter than bore 168 so that fluid may flow therepast. A cylindrical spool 260 having a fluid control orifice 262 in its upper end is slidably mounted in close contact with the inner surface of body 256. Spool 260 is yieldably urged upwardly by a spring 264 against a retaining ring 266. A side bore 268 extends through at least one side of body 256 adjacent the lower end of spool 260 when the spool is resting against retaining ring 266 as shown in its position illustrated for assembly 56.

The flow rate control valve assembly is inserted slidably into its associated bore 168, as would be flow rate control assembly 54 in bore 154, and then hydraulic fittings 206, 208 are screwed into the threaded outer end portions of bores 154, 156 serve to hold the flow rate control valve assemblies in their bores (see FIG. 3).

As is seen in FIG. 16, the lower end of bore 168 is in fluid communication with horizontal bore 142. When pressure fluid is supplied through bore 142 to bore 168 to direct operating fluid to a cylinder the assembly is in the position illustrated for assembly 56. Fluid flows from bore 142 into bore 168 through side bore 268, up through spool 260 and through orifice 262, with orifice 262 controlling the rate of fluid flow.

When fluid is permitted to return from a ram it may initially be at a higher pressure at the start of the return process and thus it may be necessary to provide additional restriction to the rate of fluid flow through such a valve assembly. Action of a flow rate control assembly for this purpose is illustrated in the action of flow rate control assembly 54 at the right side of FIG. 16. Here higher pressure fluid entering the top of bore 154 which might otherwise flow at too rapid a rate in the system produces a force against the top surface of spool 260 which will compress spring 264 sliding spool 260 downwardly to close off at least a portion of side bore 268. This provides a momentary added restriction to the flow of fluid returning from a ram. After the initial excessive pressure surge, or flow rate, has subsided somewhat spool 260 will be urged slightly upwardly again to partially open side bore 268 and provide controlled flow rate through its upper orifice 262. The specified fluid flow rating is determined mainly by the diameter of control orifice 262 and the strength of spring 264. The tolerance of fit between body 256 and spool 260, the length of spool 260 and the location and size of the side bore 268, also may have an effect on the function of this valve assembly.

Referring to FIG. 14, cushion valve assemblies 60, 62 are received in bores 134, 140, respectively. Since both of these cushion valve assemblies are substantially the same only one will be described in detail. Referring to assembly 60, it includes an elongate, generally cylindrical, plunger, or element, 274 slidably mounted in bore 134. The closed end of plunger 274 is directed toward the outer end of bore 134. A hollow internal bore 276 extends through a major portion of the plunger and opens toward the opposite end of the plunger. A spring 278 interposed between the closed inner end of bore 134 and plunger 274 yieldably biases the plunger 274 toward the outer end of bore 134. A check valve ball 280 is received within bore 276 between a conically-shaped valve seat 282 and a retainer sleeve 284 having an opening 284*a* at its lower end. Sleeve 284 is open at 284*b* along one side thereof to allow passage of fluid past the sleeve. Ball 280 is freely movable in bore 276 under the influence of fluid pressure imposed thereon between a closed position against valve seat 282 (as shown for assembly 62) and an open position spaced from valve seat 282 (as shown for assembly 60). A cross bore 288 extends through a wall of plunger 274 forwardly of valve seat 282.

Plunger 274 has the elongate, generally cylindrical, configuration illustrated in FIGS. 14, 14A, and 14B. Opposed sides of the forward end are beveled inwardly on progressing toward the forwardmost end as indicated at 274*a*, 274*b*. These beveled sides extend generally to the longitudinal midpoint of the plunger. The remainder of the forward portion of the plunger retains is generally cylindrical configuration between beveled sides 274*a*, 274*b* to provide good sliding contact and aligning engagement between the plunger 274 and its associated bore 134 throughout movement of the plunger in the bore. The beveled sides allow gradual opening of fluid flow passages from bore 34 to bore 170 as the plunger is shifted from its position as illustrated for cushion valve 62 to the position illustrated for cushion valve 60.

Plunger 274 is not tightly confined, or sealed, against the walls of bore 134 and thus some fluid may seep therepast for purposes as will be described in greater detail below.

Plugs 290 screwed into the outer ends of bores 134, 140 with O-rings therebetween seal the outer ends of these bores.

Cushion valve assemblies 60, 62 are slidably mounted in their respective bores 134, 140 adjacent intersecting bores 170, 172, respectively. The cushion valve plungers are shiftable under the influence of pressure in their respective bores between a closing position as illustrated for cushion valve assembly 62 and an open flow position as illustrated for valve assembly 60. Plungers 274 each have a cross sectional configuration closely complementary to the cross sectional configuration of their associated bores 134, 140. In an at rest condition bores 134, 140, 170, 172 are below the level of the hydraulic fluid held in supply tank 30, and thus the components of the cushion valve assembly 60, 62 are submerged in hydraulic fluid. The fluid fills the space behind plungers 274 and in the region of the spring 278.

A close sliding fit is provided between plunger 274 and its associated bore with a slight space therebetween. In an exemplary embodiment the diameter of the bore may be approximately 0.250 inch (plus or minus 0.0005 inch) and the diameter of the plunger may be 0.248 inch (plus 0.001 and minus 0.000 inch). The hydraulic fluid, or oil, used in such exemplary system is Unocal Unax AW Grade 46. When the pressure of return fluid in a bore 134, 140 is exerted against the head of a plunger 274, fluid from the region of spring 278 will gradually seep therefrom between the walls of the plunger and the bore to exit into the outlet port (170, 172) so that the plunger may move to its retracted position as illustrated for the plunger of assembly 60.

When fluid pressure in a bore 134, 140 subsides the plunger of a cushion valve assembly in the position illustrated for assembly 60 begins to return toward its extended position under the urging of spring 278. The space behind the plunger lacks sufficient hydraulic fluid to fill the space as the plunger is moved forwardly under the influence of spring 278. Fluid remaining in bores 134 and 170 flows through cross bore 288, opens the check valve ball 280 in the plunger, and flows into the space behind the plunger as it is extended by spring 278. Thus the space behind the plunger again becomes filled with hydraulic fluid as the plunger returns to the position illustrated for valve assembly 62. The check valve speeds up the response of the cushion valve.

Figure 17:
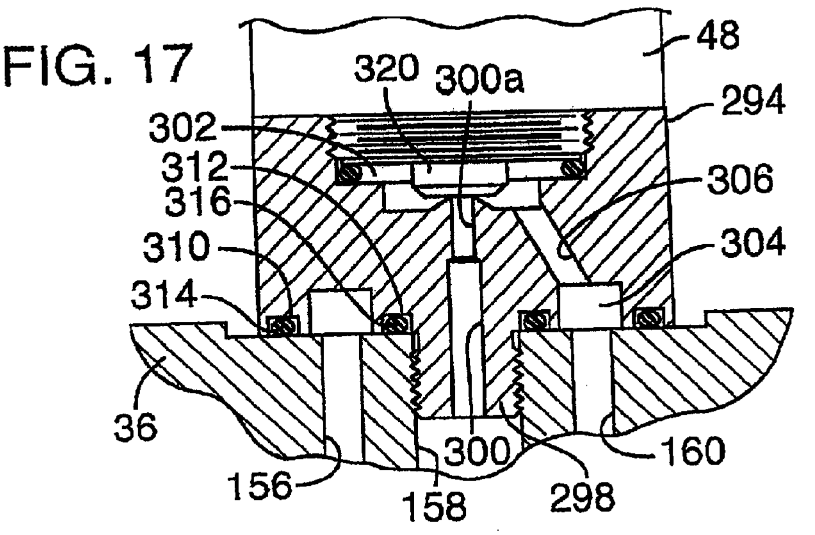
FIG. 17 is an enlarged view of one of the solenoid valve assemblies illustrated in FIG. 12 with an adapter through which it is connected to the manifold block.
Figure 18:
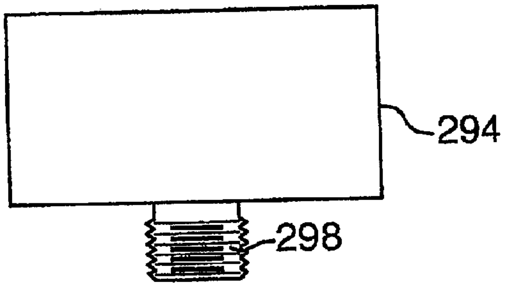
FIG. 18 is a side elevation view of the adapter of FIG. 17.
Figure 19:
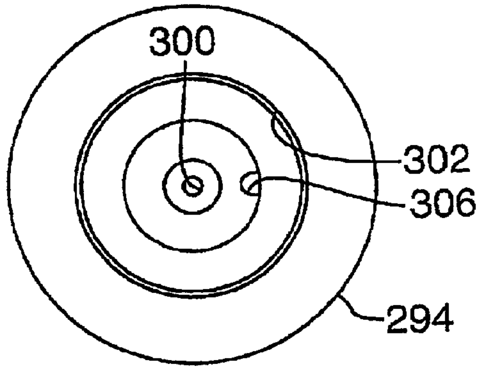
FIG. 19 is a top plan view of the adapter.
Figure 20:
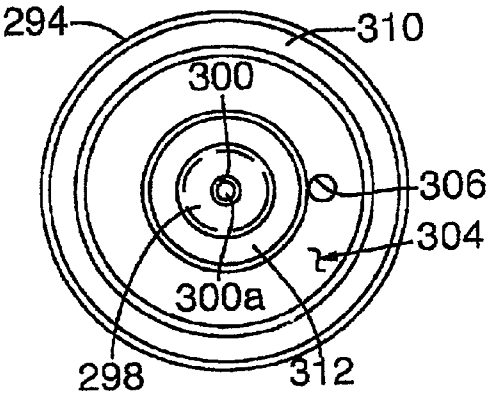
FIG. 20 is a bottom plan view of the adapter removed from the assembly.

Referring to FIGS. 3, 12, and 17, a pair of electrically actuated solenoid valves 48, 50 are secured atop manifold block 36. Solenoid valve 48 overlies bores 156, 158, 160 and solenoid valve 50 overlies bores 162, 164, 166. Solenoid valve adapters indicated generally at 294, 296 are interposed between their associated solenoid valves and the underlying manifold block. Each of the solenoids and its underlying adapter is substantially the same, and thus only one set will be described in detail.

Solenoid control valves 48, 50 are substantially similar. As best seen in FIG. 12, solenoid control valve 48 is positioned to control the flow of fluid between bore 158 and bores 156, 160 adjacent thereto. Similarly, solenoid control valve 50 is positioned to control the flow of fluid between bore 164 and bores 162, 166 adjacent thereto. Each solenoid control valve is associated with a base adapter 294, 296, respectively. When the adapter is screwed into one of the threaded bores 158, 164, a second orifice in the adapter will be aligned with an adjacent bore. Although not shown in detail, a solenoid control valve includes a spring-biased plunger which is normally closed, or seated, against the top of a bore in its associated adapter to prevent flow of fluid therethrough. Upon actuation of the solenoid the plunger is lifted to permit fluid flow.

Referring to FIGS. 17–20, adapter 294 comprises a unitary, or monolithic, body having a threaded lower protrusion 298 adapted to be screwed into the threaded upper end of its associated bore 158. A central bore 300 extends vertically through the adapter opening in the center of protrusion 298 and into the center of an internally threaded solenoid receiving cavity 302. A portion of bore 300, such as that shown at 300*a*, may be selectively sized to control fluid flow rates therethrough. Bore 300 and portion 300*a* should be larger in cross-section than orifice 262 in the flow rate control valve assemblies 54, 56. This allows valve assemblies 54, 56 to perform their intended function, which they may not do if orifices 300, 300*a* are smaller.

A circumferential channel 304 extends about the underside of body 294 and is positioned to overlie the upper ends of both of bores 156, 160 in body 36. An inclined, or side, bore 306 connects channel 304 with cavity 302 in a region offset to one side of the upper end of bore 300. As is best seen in FIG. 17, two additional smaller annular channels 310, 312 are concentric with channel 304 and receive O-rings 314, 316, respectively, to provide a seal between adapter 294 and base 36.

Solenoid 48 is shown secured in the top of adapter 294 by being screwed into threaded cavity 302. A vertically shiftable plunger 320 is controlled by operation of the solenoid. Plunger 320 is shiftable between its normally-closed position as illustrated in FIG. 17 which closes off the top of bore 300. Upon actuation of the solenoid plunger 320 is raised from the top of bore 300 to permit fluid communication between bore 300 and inclined bores 302, 306. It should be recognized that bores 156, 160 are constantly in communication with each other through annular channel 304.

Describing operation of the embodiment described, a chair as illustrated in FIG. 1 initially may be in its lowered and substantially upright position illustrated in dashed outline at 10*a*. In this position its lift cylinder 22 is retracted and tilt cylinder 24 is extended. To cause the chair to rise the operator presses the “Up” button on the touch pad 86 which provides a signal to the circuit board 88 causing motor 38 to turn in the proper direction to actuate pump 42 to provide fluid under pressure to lift cylinder 22. Fluid is drawn from sump 44, through check valve 64, through pump 42, through check valve 70, past accumulator 76, and through flow rate control valve 56 and another filter 84 to the lower end of cylinder, or ram, 22 to cause the chair to rise. Accumulator 76 moderates the flow of pressure fluid both at starting and stopping of cylinder movement. With the flow rate valve 56 disposed in the fluid supply circuit between the accumulator and actuator 22, valve 56 and the accumulator work together to moderate any fluid pressure surges. Explaining further, should an initial fluid pressure surge be produced by pump 42 such will be somewhat blocked by the restricted orifice of valve 56 permitting time for accumulator 76 to absorb the pressure surge. The chair as raised is shown in solid outline in FIG. 1.

To tilt the chair back to the position illustrated in dashed outline at 10*b* and referring to FIG. 2, the operator presses the “tilt back” button position on the touch pad 86 which provides a signal to the circuit board 88. This sends a signal through the circuit board to open solenoid control valve 48. Fluid then may return from ram 24 under the actuation of patient load and spring or joist the spring connected to the ram such as to return fluid under pressure from ram 24 through opened solenoid control valve 48 to sump 44. As the pressurized fluid returns flow rate control valve 54, accumulator 74, and cushion valve 60 moderate and control the flow of fluid to produce comfortable action of the chair as will be described in greater detail below. More specifically, at the start of fluid return, fluid flow moderation is provided mainly by the flow rate control valve and the cushion valve. When fluid return ceases, by closing of the solenoid control valve, fluid flow rate moderation at the end of movement is provided mainly by joint action of the accumulator and flow rate control valve.

Referring still to FIG. 2, to retract the lift cylinder the “down” button on the touch pad is actuated which sends a signal to the circuit board to open solenoid control valve 50. Fluid is returned from ram 22 under pressure produced by the weight of the party in the chair and/or the chair itself. As fluid flows from ram 22 through solenoid control valve 50 toward sump 44, the movement of the fluid, and thus the movement of the ram and the chair is moderated by action of the flow rate control valve 56, accumulator 76, and cushion valve 62 as will be described in greater detail below. More specifically, at the start of fluid return, fluid flow moderation is provided mainly by the flow rate control valve and the cushion valve. When fluid return ceases, by closing of the solenoid control valve, fluid flow rate moderation at the end of movement is provided mainly by joint action of the accumulator and flow rate control valve.

To return the chair from its tilted back position indicated at 10*b* in FIG. 1 to its solid outline position illustrated in FIG. 1, the operator presses the tilt return button on the touch pad 86. This causes motor 38 to turn in the proper direction to actuate pump 42 to provide fluid under pressure to tilt cylinder 24. Fluid is drawn from sump 44 through check valve 68, through pump 42, through check valve 66, past accumulator 74, and thence through flow rate control valve 54 to the lower end of tilt cylinder, or ram, 24. Accumulator 74 moderates the initial flow of pressure fluid to smooth its operation and flow rate control valve assists in this as previously described in the operation of accumulator 76 and flow rate control valve 56. Referring to the physical structure of the embodiment described, as opposed to the schematic drawing described in FIG. 2 above, in FIGS. 13–17 operative elements for control of fluid supply and return to the lift cylinder 22 are shown in their at rest position, neither extending nor retracting cylinder 22. In the illustrations such assemblies relate to check valve 64 (FIG. 15) which is closed, check valve 70 (closed in FIG. 13), accumulator 76 and its pressure relief valve 80 (FIG. 13), flow rate control valve 56 (FIG. 16), and cushion valve 62 (FIG. 14). The actual position of the piston body 234 may be retracted somewhat dependent upon the position of the chair and thus the pressure of fluid imposed upon the piston body.

The operative positions of such valve assemblies will be described initially in regard to operation of the tilt cylinder 24, recognizing that operation of the valve assemblies in the side of the control circuit for the lift cylinder would be substantially the same.

Referring to FIGS. 11, 13, and 15, upon actuation of motor 38 and pump 42 in a rotational direction to supply fluid to extend tilt ram 24, fluid is drawn upwardly from sump 44 through check valve 68 in which ball 186 lifts off of O-ring seal 190 against the urging of spring 184, as illustrated in FIG. 15, upwardly through bore 178, and into bore 138. Fluid then flows downwardly through bore 150 into kidney-shaped opening 122 to be acted upon by crescent gear pump assembly 42 which pumps the fluid under higher pressure through kidney-shaped opening 120 up through bore 148 and into horizontal bore 136. Pressure fluid thus supplied into horizontal bore 136 acts to hold ball check valve 64 closed as illustrated in FIG. 15 and to open check valve assembly 66 as illustrated in FIG. 13. With check valve assembly 66 opened, and head 220*a* and seal ring 222 moving away from seat 218*c*, fluid may flow upwardly through vertical bore 160, under the annular channel 304 in adapter 294 (as illustrated in FIG. 17) and downwardly through bore 156 into bore 132. The actual initial position of the piston body of accumulator 74 may be retracted somewhat with spring 239 slightly compressed depending on weight of patient and position of back (spring load). Additional piston movement is a result of initial rush of fluid. As pressurized fluid enters bore 132 on the pressure side of piston 234 of accumulator 74, it causes the piston to move rearwardly into what may be considered to be a lower pressure side of the piston against the yieldable biasing force of spring 239. This moderates the initial rush of pressurized fluid moving toward tilt ram 24.

Since bore 132 on the lower pressure side of piston 234 (the side of spring 239) normally is filled with fluid, a portion of such fluid wall be forced from bore 132, through bore 170 to return to the sump.

Pressure relief valve 82 also is capable of release to allow pressurized fluid to move therethrough to flow from the pressure side of the accumulator piston body to the lower pressure side of the piston and to drain therefrom through bore 170 back into the sump, if the pressure of the fluid supplied is greater than that to be controlled by the pressure relief valve 82.

Fluid moving past the accumulator enters bore 154 (as seen in FIGS. 13 and 16) to flow rate control valve 54. The fluid flows through side port, or bore, 268 through orifice 262 in spool 260 and continues therefrom toward the tilt ram 24. When fluid is flowing toward the tilt ram, fluid rate control valve 54 would be in the position as illustrated for valve 56 in FIG. 16. Port, or bore, 268 would be substantially clear for fluid to flow therethrough and the rate of fluid flow would be controlled solely by the size of orifice 262 in the end of spool 260. The moderating action of the accumulator and flow rate control valve produces a comfortable rate of tilt for a user of the chair.

Throughout this action the solenoid control valves 48, 50 remain closed. Also check valves 64, 70 remain closed.

To operate the system to extend ram 22 and raise the chair, motor 38 and pump 42 are operated in such a direction that fluid is drawn upwardly from sump 44 through ball check valve 64, into horizontally disposed bore 136, and down through bore 148 into kidney-shaped opening 120. Fluid thus delivered to the gear pump is pumped under pressure through kidney-shaped opening 122 to bore 150 and into horizontally disposed bore 138. This causes ball check valve 68 to close and check valve 70 in bore 138 to open. Fluid flows upwardly through bore 162 through annular channel 304 in a solenoid adapter, downwardly through vertical bore 166 into accumulator bore 142 to impact accumulator piston 234. Again, this accumulator piston, as was described previously for accumulator piston 74, may shift longitudinally of bore 142 under the influence of fluid pressure against one side of its head and spring 238 and fluid in bore 142 on its opposite side to moderate fluid pressure surges. Fluid then travels from bore 142 into vertical bore 168, through flow rate control valve 56, and to the lift cylinder. The valves and valve assemblies in the circuit supplying fluid to the lift ram operate similarly to those described for the circuit supplying the tilt cylinder.

To retract a ram, such as the tilt ram 24, solenoid control valve 48 is opened, by raising plunger 320 (see FIG. 17). This permits fluid to flow from the tilt cylinder 24 to cause the ram 24 to retract. Fluid under pressure flows initially into flow rate control valve 54. The initial rush of higher pressure fluid is such as to impact upon the head of spool 260 and urge it to move downwardly as illustrated in FIG. 16 against the yieldable urging force of spring 264. The lower end of the spool partially covers side bore 268 to add additional control for the rate of fluid flow through this valve.

After the initial rush of fluid, spool 260 will reach a stabilized condition within sleeve 256 such that fluid will flow at a controlled rate outwardly therefrom to accumulator bore 132 where additional moderating will occur of the fluid pressure and flow.

Fluid flows from accumulator bore 132 upwardly through bore 156 and around channel 304 and up bore 306. Since check valve 66 will be closed at this time the only escape for such fluid is through the upper end of bore 300 of the adapter (which has been opened by raising plunger 320) and downwardly through bores 300 and 158. Bore 158 intersects horizontally disposed bore 134 as best seen in FIGS. 12 and 14. Fluid flowing therein impacts the head end of plunger 274 which initially is in the position shown at the left side of FIG. 14 for cushion valve 62. As the pressurized fluid in bore 134 presses the plunger rearwardly against the biasing force of spring 278, fluid captured in the region of spring 278 behind the plunger seeps outwardly around the periphery of the plunger to exit through fluid return bore 170 which leads to the sump. Due to the length of plunger stroke as well as the close fit between the plunger and bore wall only a limited rate of fluid seepage occurs past the plunger so that the start of retraction of the ram is cushioned. Eventually sufficient fluid will seep from the region behind plunger 274 that it reaches the position illustrated for the plunger at the right side of FIG. 14 which exposes a larger portion of bore 170 for the flow of fluid from bore 134.

When solenoid valve 48 is closed again fluid pressure in bore 134 will be reduced and plunger 274 will be urged forwardly under the influence of spring 278 against a body of fluid trapped between bore 134 and the solenoid control valve. As this occurs, since fluid previously has been expressed from the rear side of the plunger, as the plunger moves forwardly under the action of spring 278 a lower pressure occurs in the area of spring 278 causing fluid in bores 134 and 170 to enter through cross bore 288, unseat ball 280, and allowing fluid to again fill the space behind the plunger, such that it is in position again for providing cushioning for the next return cycle. This occurs quickly so the tilt down movement is quick and responsive to quickly energizing the touchpad.

Retraction of lift cylinder 22 is effectuated in much the same manner, but here solenoid control valve 50 is opened with the cushioning and flow rate control therein provided by flow rate control valve 56, accumulator 76, and cushion valve 62.

The apparatus disclosed herein and its method of operation provide many advantages over prior systems. First, the system is simplified both in the hydraulic control circuit and the electrical control circuit to provide both lifting and tilting for the chair. By use of the crescent gear drive pump higher pressure capabilities are obtained with a smoother and quieter flow and operation. In the present device the gears are formed in involute profiles which do not require tight tolerances. In one embodiment 14 pinion teeth and 19 driven teeth may be provided for smooth and quiet operation.

The monolithic manifold with a number of intersecting bores machined therein extending inwardly from external surfaces of the block, but not extending fully theretherough, with a plurality of valve and control assemblies received in the bores and closing plugs with seals, provides a compact efficient system which minimizes possibilities of leakage. Further, it provides a system which has a small external configuration making it more compact for use in selected systems.

The accumulators disclosed are inexpensive and simple to manufacture and operate. Since the rear side of each accumulator piston is connected to the sump the spring and piston may be bathed in oil for lubrication purposes and any small leakage across the piston seal will not greatly affect assembly performance. Further, since the entire accumulator assembly is incorporated into the base, or manifold, no external hoses or connectors are needed for the accumulators.

Pressure compensated flow rate controls, which are self-actuating, provide restrictions so that the accumulator valves function properly and can compensate for a load so that the cylinders may retract at the same general speed regardless of the load on the chair. They provide a pressure drop so the accumulators may work for a wide variety of patient loads.

By including pressure relief valves in the accumulator pistons an inexpensive method is achieved for providing a relief path for hydraulic fluid in the event of overpressurization. Addition of such pressure limiting devices allows the omission of limit switches which normally would shut off a pump at full cylinder extension.

Timers are provided on the circuit board to limit the time that the pump operates. Further, similar time restraints are placed on the solenoids to limit the amount of time in which they are open or producing return action of the rams.

The inlet check valve assemblies are simple and inexpensive ways to accomplish the need for sealing in one direction and minimal pressure drop free flow in the other direction. Particularly of interest are the O-rings in the check valves at the base of the unit which are improvements over hard seat-type valves which may be inclined to leak. The O-rings provided supply a soft seal which produces generally trouble-free sealing.

The solenoid adapter base providing a circular path for oil between spaced apart bores not only provides a convenient method for providing desired fluid paths, but also may be supplied with different sized orifices and solenoid mounts so that different applications may be achieved.

The cushion valves provide smooth start of the lowering or return tilt action. They provide a smooth, slow chair movement at first and then allow more rapid movement through intermediate actuation.

The design of the monolithic base, or manifold, is such that there are a minimal number of plugged bores and the stacking of parts on a machining center for producing such may be optimized. Also, combining these parts into the pump assembly minimizes costs, reduces potential leak points, and minimizes the volume of the assembly for convenient installation and use. Further, minimization of the height of the assembly allows the chair to move lower than would be permitted with earlier units.

With the kidney-shaped openings machined into the manifold, or base, they may be precisely located with respect to the gears in the gear pump. This assists in providing quiet and smooth operation.

Although a preferred embodiment of the invention has been described herein, it should be apparent to those skilled in the art that variations and modifications are possible without departing from the spirit of the invention.

What is claimed is:

1. A fluid control system for use with a chair having an upper structure comprising a seat and a back rest, said upper structure adapted to be raised and lowered by means of a first fluid actuated cylinder and said back rest adapted to be tilted by means of a second fluid actuated cylinder, wherein greater fluid pressure is required to actuate the first cylinder to raise the upper structure than is required to tilt the back rest, the system comprising a first fluid supply circuit connected to said first cylinder and a second fluid supply circuit connected to said second cylinder, a bi-directional pump operatively connected to said first and second fluid supply circuits such that operation of the pump in a first direction supplies fluid under pressure to said first circuit and operation of the pump in an opposite second direction supplies fluid under pressure to said second circuit, and a reversible electric motor capable of supplying greater torque when operated in a first direction than in an opposite second direction, said motor being operatively connected to said pump to drive said pump in its first direction when said motor is operated in its first direction and to drive said pump in its second direction when said motor is operated in its second direction.

2. The system of claim 1, which further comprises a fluid holding reservoir from which said pump may draw fluid, and a series of check valves operable to open said first fluid supply circuit to permit fluid to be pumped from said reservoir to the first cylinder and to close the second fluid supply circuit when said pump is operated in said first direction.

3. The system of claim 2, wherein said series of check valves is operable to open said second fluid supply circuit to permit fluid to be pumped from said reservoir to the second cylinder and to close the first supply circuit when said pump is operated in said second direction.

4. The system of claim 1, wherein a fluid pressure accumulator is connected in a supply circuit between said pump and cylinder.

5. The system of claim 1, which further comprises a first fluid return circuit for said first cylinder and a second fluid return circuit for said second cylinder, a first selectively operable valve in said first return circuit operable in a closed position to close said circuit to the return of fluid from the first cylinder to the reservoir and in an open position to permit return of fluid to the reservoir, and a second selectively operable valve in said second return circuit operable in a closed position to close said circuit to the return of fluid from the second cylinder to the reservoir and in an open position to permit return of fluid to the reservoir.

6. A fluid control system for use with a chair having an upper structure comprising a seat and a back rest, said upper structure adapted to be raised and lowered by means of a first fluid actuated cylinder and said back rest adapted to be tilted by means of a second fluid actuated cylinder, wherein greater fluid pressure is required to actuate the first cylinder to raise the upper structure than is required to hit the back rest, the system comprising a first fluid supply circuit connected to said first cylinder and a second fluid supply circuit connected to said second cylinder, a bi-directional pump operatively connected to said first and second fluid supply circuits such that operation of the pump in a first direction supplies fluid under pressure to said first circuit and operation of the pump in an opposite second direction supplies fluid under pressure to said second circuit, and a reversible electric motor capable of supplying greater torque when operated in a first direction than in an opposite second direction, said motor being operatively connected to said pump to drive said pump in its first direction when said motor is operated in its first direction and to drive said pump in its second direction when said motor is operated in its second direction, wherein said pump is a gear pump including a crescent gear set comprising an inner pinion gear having a selected diameter and number of radially outwardly extending outer teeth, an outer ring gear having a greater diameter than said pinion gear and a greater number of radially inwardly extending inner teeth with only a minor portion of said inner teeth meshing with the outer teeth of the pinion gear at a given time, a crescent shaped member interposed between said pinion gear and ring gear, and said pinion gear being operatively connected to said motor for powered rotation by said motor with outer said ring gear being rotatably driven about said pinion gear.

7. A fluid control system for use with a chair having an upper structure comprising a seat and a back rest, said upper structure adapted to be raised and lowered by means of a first fluid actuated cylinder and said back rest adapted to be tilted by means of a second fluid actuated cylinder, wherein greater fluid pressure is required to actuate the first cylinder to raise the upper structure than is required to tilt the back rest, the system comprising a first fluid supply circuit connected to said first cylinder and a second fluid supply circuit connected to said second cylinder, a bi-directional pump operatively connected to said first and second fluid supply circuits such that operation of the pump in a first direction supplies fluid under pressure to said first circuit and operation of the pump in an opposite second direction supplies fluid under pressure to said second circuit, and a reversible electric motor capable of supplying greater torque when operated in a first direction than in an opposite second direction, paid motor being operatively connected to said pump to drive said pump in its first direction when said motor is operated in its first direction and to drive said pump in its second direction when said motor is operated in its second direction, wherein a fluid pressure accumulator is connected in a supply circuit between said pump and cylinder, and said accumulator comprises an elongate cylinder chamber, a pressure fluid inlet at one portion of said chamber, a piston sealingly located in said chamber for sliding movement axially of the chamber, with one face of the piston directed toward said pressure fluid inlet and an opposite face directed away from the pressure fluid inlet, biasing mechanism yieldably urging said piston in the direction of said fluid inlet, and a low pressure fluid outlet from the chamber on the side of the piston toward which said opposite face is directed.

8. The system of claim 7, wherein said low pressure fluid outlet comprises a restricted outlet orifice of selected size to control the flow of fluid from the chamber.

9. The system of claim 7, wherein said accumulator further comprises a pressure relief valve extending through said piston operable to release excess pressure from the pressure inlet side of said piston to the low pressure outlet side of the piston.

10. The system of claim 9, wherein said pressure relief valve comprises a relief valve bore extending through said piston from said one face to said opposite face, a valve member located in said relief valve bore for shifting between a first position closing said relief valve bore to fluid flow therethrough and a second position permitting fluid flow therethrough, and biasing mechanism urging said valve member toward said first position, said biasing mechanism being yieldable to permit movement of said valve member to its second position upon a pre-selected pressure being exerted against said valve member by fluid on the inlet side of said piston.

11. The system of claim 9, wherein said biasing mechanism comprises a spring.

12. A fluid control system for use with a chair having an upper structure comprising a seat and a back rest, said upper structure adapted to be raised and lowered by means of a first fluid actuated cylinder and said back rest adapted to be tilted by means of a second fluid actuated cylinder, wherein greater fluid pressure is required to actuate the first cylinder to raise the upper structure than is required to tilt the back rest, the system comprising a first fluid supply circuit connected to said first cylinder and a second fluid supply circuit connected to said second cylinder, a bi-directional pump operatively connected to said first and second fluid supply circuits such that operation of the pump in a first direction supplies fluid under pressure to said first circuit and operation of the pump in an opposite second direction supplies fluid under pressure to said second circuit, and a reversible electric motor capable of supplying greater torque when operated in a first direction than in an opposite second direction, said motor being operatively connected to said pump to drive said pump in its first direction when said motor is operated in its first direction and to drive said pump in its second direction when said motor operated in its second direction, a first fluid return circuit for said first cylinder and a second fluid return circuit for said second cylinder, a first selectively operable valve in said first return circuit operable in a closed position to close said circuit to the return of fluid from the first cylinder to the reservoir and in an open position to permit return of fluid to the reservoir, and a second selectively operable valve in said second return circuit operable in a closed position to close said circuit to the return of fluid from the second cylinder to the reservoir and in an open position permit return of fluid to the reservoir, wherein fluid returns from a cylinder under pressure and which further comprises a self-actuating fluid flow rate control valve comprising a chamber defined by a chamber wall with a fluid inlet opening at one region of the chamber and a fluid outlet port extending through the chamber wall spaced from the inlet opening, a plunger mounted for movement in the chamber between the inlet opening and outlet port, said plunger having a head portion facing in the direction of said inlet opening to be acted upon by fluid pressure to urge the plunger to move from a first position spaced from the outlet port toward a second position adjacent the port to inhibit outflow of fluid from the chamber through the outlet port, and biasing mechanism operable to yieldably urge the plunger toward its first position.

13. The system of claim 12, wherein said plunger is movable to multiple different positions between said first and second position adjacent the port to produce variation in out flow responsive to fluid inlet pressures.

14. The system of claim 12, wherein the head portion of said plunger has a flow rate orifice extending therethrough of a selected opening size to produce a selected rate of fluid flow.

15. The system of claim 14, wherein a selectively operable valve has a fluid flow port of a selected fluid flow size when opened and said flow rate orifice is smaller than said fluid flow port.

16. The system of claim 14, wherein said control valve further comprises an elongate hollow cylindrical sleeve defining said chamber wall, said inlet opening is provided adjacent one end of said sleeve, and said plunger is located for sliding movement axially within said sleeve.

17. The system of claim 16, which further comprises a stop for limiting the movement of said plunger in the direction of said inlet opening.

18. The system of claim 16, wherein said sleeve is substantially closed other than for said inlet opening and said outlet port.

19. The system of claim 18, wherein said inlet opening is defined at one end of said sleeve, the opposite end of said sleeve is closed, and said biasing mechanism comprises a spring interposed between said closed end of the sleeve and said plunger.

20. A fluid control system for use with a chair having an upper structure comprising a seat and a back rest, said upper structure adapted to be raised and lowered by means of a first fluid actuated cylinder and said back rest adapted to be tilted by means of a second fluid actuated cylinder, wherein greater fluid pressure is required to actuate the first cylinder to raise the upper structure than is required to tilt the back rest, the system comprising a first fluid supply circuit connected to said first cylinder and a second fluid supply circuit connected to said second cylinder, a bi-directional pump operatively connected to said first and second fluid supply circuits such that operation of the pump in a first direction supplies fluid under pressure to said first circuit and operation of the pump in an opposite second direction supplies fluid under pressure to said second circuit, and a reversible electric motor capable of supplying greater torque when operated in a first direction than in an opposite second direction, said motor being operatively connected to said pump to drive said pump in its first direction when said motor is operated in its first direction and to drive said pump in its second direction cylinder and a second fluid return circuit for said second cylinder, a first selectively operable valve in said first return circuit operable in a closed position to close said circuit to the return of fluid from the first cylinder to the reservoir and in an open position to permit return of fluid to the reservoir, and a second selectively operable valve in said second return circuit operable in a closed position to close said circuit to the return of fluid from the second cylinder to the reservoir and in an open position to permit return of fluid to the reservoir, wherein a fluid return circuit comprises a cushion valve assembly comprising a valve chamber defined by a chamber wall, a fluid pressure inlet region adjacent one portion of said chamber, a fluid outlet port extending through said chamber wall in a region spaced front said inlet region, and a plunger assembly located in said chamber for movement between a first position adjacent said outlet port to inhibit flow of fluid from said chamber through said port, and a second position permitting substantially free flow of fluid from said chamber through said port, and biasing mechanism urging said plunger assembly toward said first position and yieldable to permit movement of said plunger assembly to said second position upon a pressure above a selected pressure being exerted from said fluid inlet region on said plunger assembly.

21. The system of claim 20, wherein said plunger is movable to multiple different positions between said first and second positions.

22. The system of claim 20, wherein said plunger assembly comprises a plunger body having a substantially impermeable sidewall configuration substantially complementary to the chamber wail configuration to permit sliding movement of the plunger body within the chamber, a substantially closed head portion at one end of the plunger body facing in the direction of said inlet region, an internal bore opening toward the opposite end of said plunger body from said inlet region, a fluid flow control orifice formed adjacent said head portion permitting controlled flow of fluid into said internal bore, and a normally-closed check valve mounted in said internal bore which is urged to an open position to permit fluid flow through said orifice to said opposite end of said valve assembly.

23. A fluid control system for use with a chair having an upper structure comprising a seat and a back rest, said upper structure adapted to be raised and lowered by means of a first fluid actuated cylinder and said back rest adapted to be tilted by means of a second fluid actuated cylinder, wherein greater fluid pressure is required to actuate the first cylinder to raise the upper structure than is required to tilt the back rest the system comprising a first fluid supply circuit connected to said first cylinder and a second fluid supply circuit connected to said second cylinder, a bi-directional pump operatively connected to said first and second fluid supply circuits such that operation of the pump in a first direction supplies fluid under pressure to said first circuit and operation of the pump in an opposite second direction supplies fluid under pressure to said second circuit, and a reversible electric motor capable of supplying greater torque when operated in a first direction than in an opposite second direction, said motor being operatively connected to said pump to drive said pump in its first direction when said motor is operated in its first direction and to drive said pump in its second direction when said motor is operated in its second direction, a substantially monolithic body in which fluid routing circuits are formed and chambers are provided for receiving a plurality of valve assemblies for controlling fluid flow, said body having a plurality of bores formed therein which extend inwardly from external surface regions of the body, but do not extend fully through the body, with selected ones of said plurality of bores intersecting to produce desired fluid flow channels in the fluid supply and return circuits in the system.

24. The system of claim 23, which further comprises a plurality of valve assemblies for controlling fluid flow in the system, and a majority of said valve assemblies are operatively mounted in selected ones of said bores formed in said monolithic body.

25. The system of claim 23, wherein said pump comprises a gear pump comprising a pair of motor driven gear elements having meshing gear teeth and said monolithic body has a pump receiving cavity formed therein defining a housing for gear pump elements and having pump outlet openings machined in said body in communication with said cavity.

26. A fluid control system for use with a chair having an upper structure comprising a seat and a back rest, said upper structure adapted to be raised and lowered by means of a first fluid actuated cylinder and said back rest adapted to be tilted by means of a second fluid actuated cylinder, wherein greater fluid pressure is required to actuate the first cylinder to raise the upper structure than is required to tilt the back rest, the system comprising a first fluid supply circuit connected to said first cylinder and a second fluid supply circuit connected to said second cylinder, a bi-directional pump operatively connected to said first and second fluid supply circuits such that operation of the pump in a first direction supplies fluid under pressure to said first circuit and operation of the pump in an opposite second direction supplies fluid under pressure to said second circuit, and a reversible electric motor capable of supplying greater torque when operated in a first direction than in an opposite second direction, said motor being operatively connected to said pump to drive said pump in its first direction when said motor is operated in its first direction and to drive said pump in its second direction when said motor is operated in its second direction, and a manifold having at least three fluid flow bores opening in adjacent regions to a surface of said manifold, with a first bore opening being disposed between a second and a third bore opening, a selectively operable valve, and an adapter interposed between the manifold and the valve, the adapter comprising an adapter body having a lower portion sealingly coupled to said manifold, a central bore extending through said body positioned to communicate at one of its ends with said first bore and open at its opposite end at another region of said adapter body, a substantially continuous channel formed in the lower portion of the adapter body configured to overlie and provide fluid communication between the second and third bore openings while being segregated from said first bore opening a side bore extending through said adapter body from said channel to another region of said adapter body, and mounting means for mounting said valve on said adapter body to selectively control flow of fluid between said central bore and said side bore.

27. A fluid control system for raising and lowering a chair using pressurized fluid, said system comprising a self-actuating fluid flow rate control valve comprising a chamber defined by a chamber wall with a fluid inlet opening at one region of the chamber and a fluid outlet port extending through the chamber wall spaced from the inlet opening, a valve member located for movement in the chamber between the inlet opening and port, said valve member having a head portion facing in the direction of said inlet opening to be acted upon by fluid pressure to urge the valve member to move from a first position spaced from the port toward a second position adjacent the port to inhibit outflow of fluid from the chamber through the port, and biasing mechanism operable to yieldably urge the valve member toward its first position.

28. The system of claim 27, wherein the head portion of said valve member has an orifice extending therethrough of a selected opening size to produce a selected rate of fluid flow.

29. The system of claim 28, wherein said control valve further comprises an elongate cylindrical sleeve defining said chamber wall, said inlet opening is provided adjacent one end of said sleeve, and said valve member is located for sliding movement axially within said sleeve.

30. The system of claim 29, wherein the end of the sleeve opposite said one end is closed, and said outlet port is positioned between said one end and said opposite end.

31. The system of claim 29, which further comprises a stop for limiting the movement of said valve member in the direction of said inlet opening.

32. A fluid control system for raising and lowering a chair using pressurized fluid, said system comprising a cushion valve comprising a valve chamber defined by a chamber wall, a fluid pressure inlet adjacent one portion of said chamber, a fluid outlet port extending through said chamber wall in a region spaced from said inlet region and a valve assembly located in said chamber for movement between a first position adjacent said port to inhibit flow of fluid from said chamber through said port, and a second position permitting substantially free flow of fluid from said chamber through said port, and biasing mechanism urging said valve assembly toward said first position and yieldable to permit movement of said valve assembly to said second position upon a pressure above a selected pressure being exerted by fluid from said fluid inlet region on said valve assembly.

33. The system of claim 32, wherein said cushion valve assembly comprises a valve body having a sidewall configuration substantially complementary to the chamber wall configuration to permit sliding movement of the valve body within the chamber, a substantially closed head portion at one end of the valve body facing in the direction of said inlet region, an internal bore opening toward the opposite end of said valve body from said inlet region, a fluid flow control orifice formed adjacent said head portion permitting controlled flow of fluid into said internal bore, and a normally-closed check valve mounted in said internal bore which is urged to an open position to permit fluid flow through said orifice to said opposite end of said valve assembly.

34. The system of claim of claim 32, wherein said chamber has a closed end spaced from said inlet portion, and said fluid outlet port is positioned between said inlet portion and said closed end, and said valve assembly comprises a valve member having an outer configuration substantially complementary to an internal surface of said chamber wall and received in said chamber in close sliding contact with said chamber wall, and a retaining space defined between said valve member and said closed end of said chamber capable of retaining a quantity of impeding fluid to impede movement of said valve member to said second position, said valve member being mated to said chamber wall such that a quantity of impeding fluid may be expressed slowly from said retaining space to said port to allow the valve member to move slowly toward said second position.

35. The system of claim 34, wherein said valve assembly further comprises a fluid flow orifice extending through a portion of the valve member directed toward said inlet portion, and a check valve permitting fluid flow from said orifice to said retaining space and inhibiting fluid flow in a reverse direction.

36. The system of claim 32, wherein said cushion valve assembly comprises a valve body having a substantially impermeable sidewall configuration substantially complementary to the chamber wall configuration to permit sliding movement of the valve body within the chamber, a substantially closed head portion at one end of the valve body facing in the direction of said inlet region, an internal bore opening toward the opposite end of said valve body from said inlet region, a fluid flow control orifice formed adjacent said head portion permitting controlled flow of fluid into said bore, and a normally-closed check valve mounted in said bore which is urged to an open position to permit fluid flow through said orifice to said opposite side of said valve assembly.

37. A control system for a chair comprising a fluid pressure operated chair actuator, a reservoir for holding fluid, a pump, a fluid flow circuit operatively connecting said pump to said reservoir and actuator allowing the pump to draw fluid from the reservoir and to supply fluid under pressure to said chair actuator and for returning fluid from the actuator to the reservoir, said fluid flow circuit comprising a selectively operable valve to control return of fluid from the actuator to said reservoir, a fluid pressure accumulator connected in said circuit between said pump and chair actuator and between said chair actuator and said selectively operable valve to provide accumulator action upon supply of fluid under pressure to said chair actuator and upon return of fluid from the actuator to the reservoir, and a flow rate control valve connected in said circuit between the chair actuator and the accumulator.

38. The control system of claim 37, wherein said flow circuit comprises a fluid return circuit through which fluid is returned from said actuator to the reservoir and said accumulator and flow rate control valve are positioned in said fluid return circuit with said flow rate control valve disposed between said actuator and said accumulator.

39. The control system of claim 38, wherein said selectively operable valve is positioned in said fluid return circuit.

40. The control system of claim 38, wherein said fluid return circuit further comprises a cushion valve assembly disposed between said accumulator and the reservoir.

41. The control system of claim 40, wherein said cushion valve assembly comprises a valve chamber defined by a chamber wall, a fluid pressure inlet region adjacent one portion of said chamber, a fluid outlet port extending through said chamber wall in a region spaced from said inlet region, and a valve assembly comprising a plunger mounted in said chamber for movement between a first position adjacent said port to inhibit flow of fluid from said chamber through said port, and a second position permitting less inhibited flow of fluid from said chamber through said port, and biasing mechanism urging said plunger toward said first position and yieldable to permit movement of said plunger to said second position upon a pressure above a selected pressure being exerted from said fluid inlet region on said plunger assembly.

42. The control system of claim 37, wherein said fluid flow circuit comprises a fluid supply circuit through which fluid is provided from said motor to said chair actuator and said accumulator and flow rate control valve are positioned in said fluid supply circuit with said flow rate control valve disposed between said accumulator and said chair actuator.

43. A control system for a chair comprising a fluid pressure operated chair actuator, a reservoir for holding fluid, a pump, a fluid flow circuit operatively connecting said pump to said reservoir and actuator allowing the pump to draw fluid from the reservoir and to supply fluid under pressure to said chair actuator and for returning fluid from the actuator to the reservoir, said fluid flow circuit comprising a selectively operable valve to control return of fluid from the actuator to said reservoir, a fluid pressure accumulator connected in said circuit between said pump and chair actuator and between said chair actuator and said selectively operable valve, and a flow rate control valve connected in said circuit between the chair actuator and the accumulator, wherein said accumulator comprises an elongate cylinder chamber, a pressure fluid inlet at one portion of said chamber, a piston sealingly mounted in said chamber for sliding movement axially of the chamber, with one face of the piston directed toward said pressure fluid inlet and an apposite face directed away from the pressure fluid inlet, biasing mechanism yieldably urging said piston in the direction of said fluid inlet, and a low pressure fluid outlet from the chamber on the side of the piston toward which said opposite face is directed.

44. The system of claim 43, wherein said low pressure fluid outlet comprises a restricted outlet orifice of selected size to control the flow of fluid from the chamber.

45. The system of claim 43, wherein said accumulator further comprises a pressure relief valve extending through said piston operable to release excess pressure from the pressure inlet side of said piston to the low pressure outlet side of the piston.

46. The system of claim 45, wherein said pressure relief valve comprises a bore extending through said piston from said one face to said opposite face, a valve member mounted for shifting between a first position closing said bore to fluid flow therethrough and a second position permitting fluid flow therethrough, and biasing mechanism urging said valve member toward said first position, said biasing mechanism being yieldable to permit movement of said valve member to its second position upon a pre-selected pressure being exerted against said valve member by fluid on the inlet side of said piston.

47. The system of claim 45, wherein said biasing mechanism comprises a spring.

48. A control system for a chair comprising a fluid pressure operated chair actuator, a reservoir for holding fluid, a pump, a fluid flow circuit operatively connecting said pump to said reservoir and actuator allowing the pump to draw fluid from the reservoir and to supply fluid under pressure to said chair actuator and for returning fluid from the actuator to the reservoir, said fluid flow circuit comprising a selectively operable valve to control return of fluid from the actuator to said reservoir, a fluid pressure accumulator connected in said circuit between said pump and chair actuator and between said chair actuator and said selectively operable valve, and a flow rate control valve connected in said circuit between the chair actuator and the accumulator, wherein fluid returns from said chair actuator under pressure and said flow rate control valve comprises a self-actuating valve comprising a chamber defined by a chamber wall with a fluid inlet opening at one region of the chamber and a fluid outlet port extending through the chamber wall spaced from the inlet opening, a plunger mounted for movement in the chamber between the inlet opening and port, said plunger having a head portion facing in the direction of said inlet opening to be acted upon by fluid pressure to urge the plunger to move from a first position spaced from the port toward a second position adjacent the port to inhibit outflow of fluid from the chamber through the port, and biasing mechanism urging the plunger toward its first position.

49. The system of claim 48, wherein said plunger is movable to multiple different positions between said first and second positions adjacent the port to produce variation in fluid outflow responsive to fluid inlet pressures.

50. The system of claim 48, wherein the head portion of said plunger has an orifice extending therethrough of a selected opening size to produce a selected rate of fluid flow.

51. The system of claim 50, wherein said flow rate control valve further comprises an elongate hollow cylindrical sleeve defining said chamber wall, said inlet opening is provided adjacent one end of said sleeve, and said plunger is mounted for sliding movement axially within said sleeve.

52. The system of claim 51, wherein the end of the sleeve opposite said one end is closed, and said port is positioned between said one end and said opposite end.

53. The system of claim 51, which further comprises a stop for limiting the movement of said plunger in the direction of said inlet opening.

54. The system of claim 50, wherein said sleeve is substantially closed other than for said inlet opening and said port.

55. The system of claim 54, wherein said inlet opening is defined at one end of said sleeve, the opposite end of said sleeve is closed, and said biasing mechanism comprises a spring interposed between said closed end of the sleeve and said plunger.

56. A control system for a chair comprising
a fluid pressure operated chair actuator,
a reservoir for holding fluid,
a pump,
a fluid flow circuit operatively connecting said pump to said reservoir and actuator allowing the pump to draw fluid from the reservoir and to supply fluid under pressure to said chair actuator and for returning fluid from the actuator to the reservoir, said fluid flow circuit comprising a selectively operable valve to control return of fluid from the actuator to said reservoir, a fluid pressure accumulator connected in said circuit between said pump and chair actuator and between said chair actuator and said selectively operable valve, and a flow rate control valve connected in said circuit between the chair actuator and the accumulator, wherein said fluid flow circuit further comprises a cushion valve assembly.

57. The system of claim 56, wherein said cushion valve assembly comprises a valve chamber defined by a chamber wall, a fluid pressure inlet region adjacent one portion of said chamber, a fluid outlet port extending through said chamber wall in a region spaced from said inlet region, and a valve assembly comprising a plunger mounted in said chamber for movement between a first position adjacent said port to inhibit flow of fluid from said chamber through said port, and a second position permitting less inhibited flow of fluid from said chamber through said port, and biasing mechanism urging said plunger toward said first position and yieldable to permit movement of said plunger said second position upon a pressure above a selected pressure being exerted from said fluid inlet region on said plunger assembly.

58. The system of claim 57, wherein said plunger is movable to multiple different positions between said first and second positions.

59. The system of claim 57, wherein said plunger comprises a plunger body having a substantially impermeable sidewall configuration substantially complementary to the chamber wall configuration to permit sliding movement of the plunger body within the chamber, a substantially closed head portion at one end of the plunger body facing in the direction of said inlet region, an internal bore opening toward the end of said plunger body opposite said inlet region, a fluid flow control orifice formed adjacent said head portion permitting controlled flow of fluid into said internal bore, and a normally-closed check valve mounted in said internal bore which is urged to an open position to permit fluid to flow through said orifice to said opposite end of said plunger body.

60. The system of claim of claim 57, wherein said valve chamber has a closed end spaced from said inlet portion, said fluid outlet port is positioned between said inlet portion and said closed end, and said plunger has an outer configuration substantially complementary to an internal surface of said chamber wall and is received in said chamber in close sliding contact with said chamber wall, and a retaining space defined between said plunger and said closed end of said chamber capable of retaining a quantity of impeding fluid to impede movement of said plunger to said second position, said plunger being mated to said chamber wall such that a quantity of impeding fluid may be expressed slowly from said retaining space to said port to allow the plunger to move slowly toward said second position.

61. The system of claim 60, wherein said valve assembly further comprises a fluid flow orifice extending through a portion of the plunger directed toward said inlet portion, and a check valve permitting fluid flow from said orifice to said retaining space and inhibiting fluid flow in a reverse direction.

62. A control system for a chair comprising
a first fluid pressure operated chair actuator,
a second fluid pressure operated chair actuator,
a reservoir for holding fluid,
a bi-directional pump,
a first fluid flow circuit operatively connecting said pump to said reservoir and to said first chair actuator allowing the pump when operated in one direction to draw fluid from the reservoir and to supply fluid under pressure to said first chair actuator and for returning fluid from the first chair actuator to the reservoir, said first fluid flow circuit comprising a first selectively operable valve to control return of fluid from the actuator to said reservoir, a first fluid pressure accumulator connected in said first circuit between said pump and first chair actuator and between said first chair actuator and said first selectively operable valve to provide accumulator action upon supply of fluid under pressure to said chair actuator and upon return of fluid from the actuator to the reservoir, and a first flow rate control valve connected in said first circuit between said first chair actuator and said first accumulator, and
a second fluid flow circuit operatively connecting said pump to said reservoir and to said second chair actuator allowing the pump when operated in a direction opposite said one direction to draw fluid from the reservoir and to supply fluid under pressure to said second chair actuator and for returning fluid from the second chair actuator to the reservoir, said second fluid flow circuit comprising a second selectively operable valve to control return of fluid from the second chair actuator to said reservoir, a second fluid pressure accumulator connected in said second circuit between said pump and second chair actuator and between said second chair actuator and said second selectively operable valve to provide accumulator action upon supply of fluid under pressure to said chair actuator and upon return of fluid from the actuator to the reservoir, and a second flow rate control valve connected in said second circuit between said second chair actuator and said second accumulator.

63. A control system for a chair comprising
a first fluid pressure operated chair actuator,
a second fluid pressure operated chair actuator,
a reservoir for holding fluid,
a bi-directional pump,
a first fluid flow circuit operatively connecting said pump to said reservoir and to said first chair actuator allowing the pump when operated in one direction to draw fluid from the reservoir and to supply fluid under pressure to said first chair actuator and for returning fluid from the first chair actuator to the reservoir, said first fluid flow circuit comprising a first selectively operable valve to control return of fluid from the actuator to said reservoir, a first fluid pressure accumulator connected in said first circuit between said pump and first chair actuator and between said first chair actuator and said first selectively operable valve, and a first flow rate control valve connected in said first circuit between said first chair actuator and said first accumulator, and
a second fluid flow circuit operatively connecting said pump to said reservoir and to said second chair actuator allowing the pump when operated in a direction opposite said one direction to draw fluid from the reservoir and to supply fluid under pressure to said second chair actuator and for returning fluid from the second chair actuator to the reservoir, said second fluid flow circuit comprising a second selectively operable valve to control return of fluid from the second chair actuator to said reservoir, a second fluid pressure accumulator connected in said second circuit between said pump and second chair actuator and between said second chair actuator and said second selectively operable valve, and a second flow rate control valve connected in said second circuit between said second chair actuator and said second accumulator, wherein said first fluid flow circuit comprises a first cushion valve and said second fluid flow circuit comprises a second cushion valve.

64. The system of claim 62, wherein said first and second fluid flow circuits comprise check valves which inhibit flow of fluid under pressure from said pump to said second chair actuator when the pump is operated in said one direction and inhibit flow of fluid under pressure from said pump to said first chair actuator when said pump is operated in said opposite direction.

* * * * *

UNITED STATES PATENT AND TRADEMARK OFFICE
CERTIFICATE OF CORRECTION

PATENT NO. : 6,814,409 B2
APPLICATION NO. : 10/121266
DATED : November 9, 2004
INVENTOR(S) : Henry Warn Jackson It is certified that error appears in the above-identified patent and that said Letters Patent is hereby corrected as shown below:

Column 3, line 60, “bi-directional may” should read --bi-directional, may--.

Column 3, line 64, “torque to” should read --torque, to--.

Column 5, line 36, “gear feed kidney” should read --gear feed kidneys--.

Column 9, line 3, “156 serve” should read --156, which serve--.

Column 11, line 37, “actuation of the” should read --actuation, the--.

Column 12, line 24, “the chair” should read --the chair,--.

Column 16, line 62, “required to hit” should read --required to tilt--.

Column 17, line 39, “paid motor” should read --said motor--.

Column 18, line 29, “motor operated” should read --motor is operated--.

Column 19, line 49, “spaced front” should read --spaced from--.

Column 19, line 66, “chamber wail” should read --chamber wall--.

Column 20, line 17, “back rest the” should read --back rest, the--.

Column 23, line 52, “an apposite face” should read --an opposite face--.

Column 24, line 60, “claim 50” should read --claim 51--.

Column 25, line 30, “plunger said” should read --plunger to said--.

UNITED STATES PATENT AND TRADEMARK OFFICE

CERTIFICATE OF CORRECTION

PATENT NO. : 6,814,409 B2 
APPLICATION NO. : 10/121266
DATED : November 9, 2004
INVENTOR(S) : Henry Warn Jackson It is certified that error appears in the above-identified patent and that said Letters Patent is hereby corrected as shown below:

Column 25, line 51, “system of claim of claim” should read --system of claim--.

Signed and Sealed this

Fourteenth Day of August, 2007

JON W. DUDAS
*Director of the United States Patent and Trademark Office*